US011887283B2

(12) United States Patent
Zhou et al.

(10) Patent No.: US 11,887,283 B2
(45) Date of Patent: Jan. 30, 2024

(54) FAST DISTORTION CORRECTION FOR WIDE FIELD OF VIEW (FOV) CAMERAS

(71) Applicant: Apple Inc., Cupertino, CA (US)

(72) Inventors: Jianping Zhou, Fremont, CA (US); Ali-Amir Aldan, Sunnyvale, CA (US); Sebastien X. Beysserie, Milpitas, CA (US)

(73) Assignee: Apple Inc., Cupertino, CA (US)

(*) Notice: Subject to any disclaimer, the term of this patent is extended or adjusted under 35 U.S.C. 154(b) by 155 days.

(21) Appl. No.: 17/656,734

(22) Filed: Mar. 28, 2022

(65) Prior Publication Data

US 2022/0335579 A1 Oct. 20, 2022

Related U.S. Application Data

(60) Provisional application No. 63/176,591, filed on Apr. 19, 2021.

(51) Int. Cl.
*G06V 10/25* (2022.01)
*G06T 5/00* (2006.01)
*G06T 3/00* (2006.01)

(52) U.S. Cl.
CPC ............ *G06T 5/006* (2013.01); *G06T 3/0093* (2013.01); *G06V 10/25* (2022.01)

(58) Field of Classification Search
None
See application file for complete search history.

(56) References Cited

U.S. PATENT DOCUMENTS

| | | | |
|---|---|---|---|
| 8,599,238 B2 | 12/2013 | Wu | |
| 9,658,688 B2* | 5/2017 | Shen | G06F 3/013 |
| 10,097,759 B1 | 10/2018 | Motta | |
| 10,154,228 B1 | 12/2018 | Van Tuyl Bentley | |
| 10,241,207 B2* | 3/2019 | Rosenzweig | G01S 7/4812 |
| 11,533,428 B2* | 12/2022 | Sindhagatta Krishnappa | H04N 23/631 |

(Continued)

OTHER PUBLICATIONS

Philpot, W., "Topic 4: Geometric Correction," CEE 615: Digital Image Processing, Cornell University, Jan. 1.

(Continued)

*Primary Examiner* — Saptarshi Mazumder
(74) *Attorney, Agent, or Firm* — Blank Rome LLP

(57) ABSTRACT

Devices, methods, and non-transitory program storage devices are disclosed herein to provide for improved perspective distortion correction for wide field of view (FOV) video image streams. The techniques disclosed herein may be configured, such that the distortion correction applied to requested region of interest (ROI) portions taken from individual images of the wide FOV video image stream smoothly transitions between applying different distortion correction to ROIs, depending on their respective FOVs. In particular, the techniques disclosed herein may modify the types and/or amounts of perspective distortion correction applied, based on the FOVs of the ROIs, as well as their location within the original wide FOV video image stream. In some cases, additional perspective distortion correction may also be applied to account for tilt in an image capture device as the wide FOV video image stream is being captured and/or the unwanted inclusion of "invalid" pixels from the wide FOV image.

20 Claims, 11 Drawing Sheets

(56) References Cited

U.S. PATENT DOCUMENTS 11,647,290 B2 * 5/2023 Kempf .................. H04N 23/69
                                                                     348/369
2019/0172238 A1 6/2019 Miao
2020/0382725 A1 12/2020 Gao

OTHER PUBLICATIONS

Shih, et al., "Distortion-Free Wide-Angle Portraits on Camera Phones," ACM Trans. Graph., vol. 38, No. 4, Article 61, Jul. 2019.

* cited by examiner

FAST DISTORTION CORRECTION FOR WIDE FIELD OF VIEW (FOV) CAMERAS

TECHNICAL FIELD

This disclosure relates generally to the field of image processing. More particularly, but not by way of limitation, it relates to techniques for image framing and perspective distortion correction for wide field of view (FOV) video image streams.

BACKGROUND

The advent of portable integrated computing devices has caused a wide proliferation of cameras and other video capture-capable devices. These integrated computing devices commonly take the form of smartphones, tablets, or laptop computers, and typically include general purpose computers, cameras, sophisticated user interfaces including touch-sensitive screens, and wireless communications abilities through Wi-Fi, LTE, HSDPA, New Radio (NR), and other cell-based or wireless technologies. The wide proliferation of these integrated devices provides opportunities to use the devices' capabilities to perform tasks that would otherwise require dedicated hardware and software. For example, integrated devices such as smartphones, tablets, and laptops typically have two or more embedded cameras. These cameras generally amount to lens/camera hardware modules that may be controlled through the general purpose computer using firmware and/or software (e.g., "Apps") and a user interface, including touch-screen buttons, fixed buttons, and/or touchless controls, such as voice control.

The integration of cameras into communication devices such as smartphones, tablets, and laptop computers has enabled people to share images and videos in ways never before possible. It is now very popular to acquire and immediately share photos and video with other people, either by sending them via text message, SMS, or email—or by uploading them to an Internet-based service, such as a social networking site or a multimedia sharing site.

Along with the rise in popularity of photo and video sharing via portable integrated computing devices having integrated cameras has come a rise in videoconferencing via portable integrated computing devices. In particular, users often engage in videoconferencing calls, with the video images typically captured by a front-facing camera on the device, i.e., a camera that faces in the same direction as the camera device's display screen. Most prior art cameras are optimized for either wide angle general photography or for narrower-angle self-portraits and videoconferencing streaming use cases. Those cameras that are optimized for wide angles are typically optimized for group and landscape compositions, but are not optimal for individual portraits, due, e.g., to the distortion that occurs when subjects are at short distances from the camera or at the edges of the camera's field of view. Those cameras that are optimized for portraits and video conference streaming (e.g., "front-facing" cameras) are typically not optimal for landscapes and group photos (or group videoconferencing calls) because of their limited field of view. Moreover, the field of view of a given camera also may influence how the user composes the shot (i.e., how far away and at what angle they position themselves with respect to the device's camera) and the quality of the ultimate captured image.

"Field of view" or "FOV," as used herein, refers to the angular extent of a given scene that is imaged by a camera. FOV is typically measured in terms of a number of degrees, and may be expressed as a vertical FOV, horizontal FOV, and/or diagonal FOV. The diagonal FOV of the image sensor is often referred to herein, as it is a more relevant measure of the camera's optics, since it attempts to cover the corners of the image, where "roll off," i.e., vignetting, problems associated with pixels at the corners of the image sensor may become more pronounced. For reference, a typical 35 mm camera with a lens having a focal length of 50 mm will have a horizontal FOV of 39.6°, a vertical FOV of 27.0°, and a diagonal FOV of 46.8°.

For a given camera-to-subject distance, wide angle lenses (e.g., lenses with focal lengths shorter than the sensor diagonal and/or diagonal FOVs of larger than 70°) will distort perspective, such that objects that are closer to the camera appear to be larger than they would with a normal lens, and distant objects appear to be smaller and further away. Also, objects near the edges of a wide angle lens camera's FOV may become stretched and/or curved, resulting in an unnatural appearance, especially for human faces. Because of these distortions, wide angle lenses are not typically used for portraits, one-on-one videoconferencing situations, or other image capture scenarios where the correct appearance and/or dimensions of a human subject's faces is important for the given application.

Likewise, because of their relatively more limited field of view, a normal or standard lens (e.g., lenses with a focal length approximately equal to the sensor diagonal and/or diagonal FOVs of smaller than 70°) is not typically used for photography or video recording of landscapes or larger groups of people (who would often be spread across a larger portion of a scene being captured) and/or in stationary camera settings, wherein the people in a scene that is being captured may regularly move around within the scene—which would cause them to repeatedly pass into (and out of) a standard lens stationary camera's more limited FOV.

Thus, it would be desirable to have methods and systems that provide for improved image framing ("framing," as used herein, refers to a process of determining what portion(s) of a wider FOV source image for use in generation of an output image) and perspective distortion correction for wide FOV video image streams, such that the captured video stream from the wide FOV camera is intelligently and dynamically perspective distortion corrected, e.g., via non-linear warping, to produce an output video image stream with any desired FOV (from a very narrow FOV all the way up to a very wide FOV) from frame to frame of the video stream. Such techniques should also preferably be efficient, in terms of both processing cycles and power consumption, such that they can meet the low-latency and low-power requirements of video streaming and videoconferencing applications on portable integrated computing devices. Further, such techniques should take temporal consistency into account when performing perspective distortion correction on a video image stream, so as to avoid jarring or aesthetically unpleasing results.

SUMMARY

Devices, methods, and non-transitory program storage devices (NPSDs) are disclosed herein to provide for improved distortion correction for wide field of view (FOV) video image streams. In particular, the techniques disclosed herein may be configured, such that the distortion correction applied to portions taken from within the images of the wide FOV video image stream seamlessly transition between applying appropriate distortion correction techniques to a narrower portion of the wide angle camera's FOV (e.g., when a single subject is in the scene) to applying appropriate distortion correction techniques to a wider portion of the wide angle camera's FOV (e.g., when multiple subjects are in the scene), depending on the composition and movement of relevant subjects in the captured scene over time.

The techniques disclosed herein may also modify the types and degrees of distortion correction applied to the framed images in an output video image stream generated from the input video image stream. These modifications may be based, at least in part, on the FOVs of the framed images, as well as the location within the original wide FOV video image stream that a given output image was framed from (e.g., a central portion of the wide FOV video image stream requires less distortion correction than a portion taken from a more peripheral portion of the wide FOV video image stream). In some cases, additional perspective distortion correction may also be applied to account for tilt in the image capture device as the input video image stream is being captured and/or the unwanted inclusion of "invalid" pixels from the wide FOV image.

Thus, according to some embodiments, there is provided a device, comprising: a memory; one or more image capture devices; and one or more processors operatively coupled to the memory, wherein the one or more processors are configured to execute instructions causing the one or more processors to: obtain an incoming image stream from at least one of the one or more image capture devices, wherein the incoming image stream comprises two or more images; determine a set of geometric distortion corrections for a first image from the incoming image stream, wherein the first image has a first field of view (FOV); determine a region of interest (ROI) in the first image, wherein the ROI comprises a location within the first image and a second FOV, wherein the second FOV is smaller than or equal to the first FOV, and wherein the ROI comprises a region within the first image that it is desired to focus a perspective distortion correction on; determine a set of perspective distortion corrections for the first image based, at least in part, on the location and second FOV of the ROI; determine a set of fisheye distortion corrections to apply to a perspective distortion corrected version of the first image based, at least in part, on the location and second FOV of the ROI; and apply a combined distortion correction to the ROI of the first image based on: the determined set of geometric distortion corrections; and a combination of the determined set of perspective distortion corrections and the determined set of fisheye distortion corrections. If desired, the distortion corrected version of the first image may then be displayed on the device, stored in the device's memory, and/or transmitted to a second device.

In other embodiments, the one or more processors may be further configured to: determine a set of geometric distortion corrections for a second image from the incoming image stream, wherein the second image has the first FOV, and wherein the second image is captured after the first image; determine a second ROI in the second image, wherein the second ROI comprises a second location within the second image and a third FOV, wherein the third FOV is smaller than or equal to the first FOV, and wherein the second ROI comprises a region within the second image that it is desired to focus a perspective distortion correction on; determine a second set of perspective distortion corrections for the second image based, at least in part, on the second location and third FOV of the second ROI; determine a second set of fisheye distortion corrections to apply to a perspective distortion corrected version of the second image based, at least in part, on the second location and third FOV of the second ROI; and apply a second combined distortion correction to the second ROI of the second image based on: the determined second set of geometric distortion corrections; and a combination of the determined second set of perspective distortion corrections and the determined second set of fisheye distortion corrections. (It is to be understood that similar perspective distortion correction techniques could be applied to any or all of the images from an incoming image stream, with the application of the perspective distortion correction techniques dynamically and smoothly changing, based on the changing FOV and location of the ROI(s) in the respective images captured in the incoming image stream.) In some cases, the ROI may comprise a region in the first image including one or more people, animals, or objects of interest.

In other embodiments, the device may further comprise a positional sensor, wherein the one or more processors are further configured to execute instructions causing the one or more processors to: obtain a gravitational vector from the positional sensor associated with a three-dimensional position of the device during the capture of the first image. In other such embodiments, the instructions causing the one or more processors to apply the combined distortion correction to the ROI of the first image further comprise instructions causing the one or more processors to: determine a gravity correction parameter based on the obtained gravitational vector; and apply the combined distortion correction to the ROI of the first image further based on the determined gravity correction parameter. In these embodiments, any additional tilt correction may be applied to the perspective distortion corrected image, in order to account for the orientation of the image capture device as the images are being captured.

In still other embodiments, the one or more processors may be further configured to: determine that the determined set of perspective distortion corrections would result in one or more invalid pixels in the ROI of the first image after the application of the combined distortion correction. In some such embodiments, in response to determining that the determined set of perspective distortion corrections would result in one or more invalid pixels in the first image, the one or more processors are further configured to execute instructions causing the one or more processors to: shift the location of the ROI away from the one or more invalid pixels. In other such embodiments, in response to determining that the determined set of perspective distortion corrections would result in one or more invalid pixels in the first image, the one or more processors are further configured to execute instructions causing the one or more processors to: reduce a size of the second FOV of the ROI to exclude the one or more invalid pixels. In some cases, the processors may perform a combination of shifting and size reduction (if necessary) to avoid including invalid pixels in the perspective distortion-corrected ROI.

In other embodiments, the one or more processors are further configured to: determine a second ROI in the first image, wherein the second ROI comprises a second location within the first image and a third FOV, wherein the second ROI comprises a second region within the first image that it is desired to focus a second perspective distortion correction on (e.g., a second human subject); determine a second set of perspective distortion corrections for the first image based, at least in part, on the second location and third FOV of the second ROI; determine a second set of fisheye distortion corrections to apply to a perspective distortion corrected version of the second image based, at least in part, on the second location and third FOV of the second ROI; and apply a second combined distortion correction to the second ROI of the first image based on: the determined set of geometric distortion corrections; and a combination of the determined second set of perspective distortion corrections and the determined second set of fisheye distortion corrections. In some such embodiments, the one or more processors may: generate a first output image, wherein the first output image comprises: the ROI of the first image after the application of the combined distortion correction; and the second ROI of the first image after the application of the second combined distortion correction, e.g., composited in a non-overlapping fashion.

In other embodiments, the combination of the determined set of perspective distortion corrections and the determined set of fisheye distortion corrections comprises a weighted average between the determined set of perspective distortion corrections and the determined set of fisheye distortion corrections (each of which may comprise global transformation operations). In some such embodiments, the weighted average between the determined set of perspective distortion corrections and the determined set of fisheye distortion corrections is determined based, at least in part, on a size of the second FOV.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1:
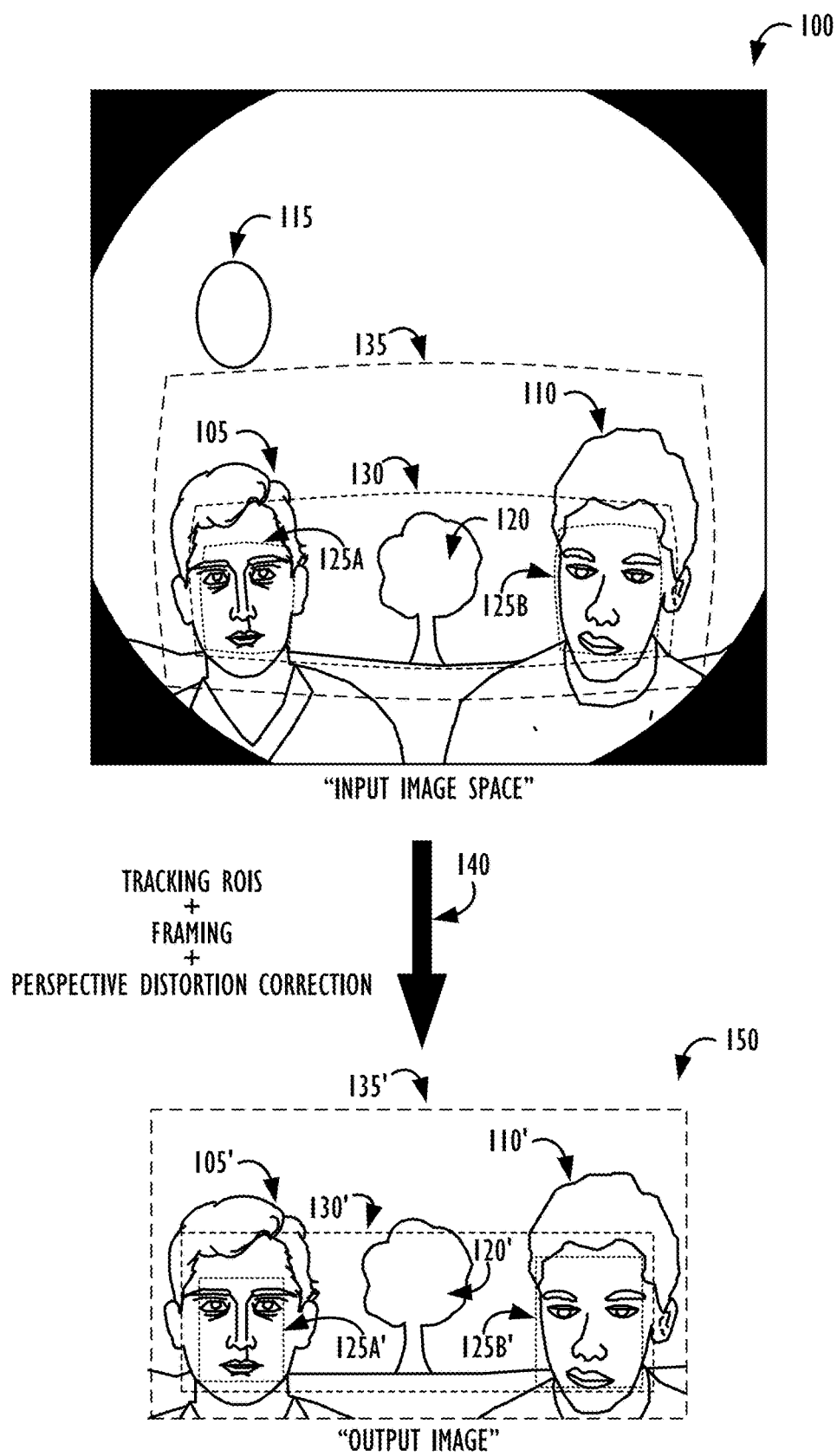
FIG. 1 illustrates an exemplary wide FOV image and a framed and distortion-corrected portion thereof, according to one or more embodiments.

Exemplary Wide FOV Image Region of Interest
(ROI) Tracking, Framing, and Distortion-Correction Turning now to FIG. 1, an exemplary wide FOV image 100 and a framed and distortion-corrected portion thereof 150 is shown, according to one or more embodiments. Looking first at exemplary wide FOV image 100, as illustrated by the circular shape of the wide FOV image 100, it may be seen that the captured scene comprises an ultra-wide FOV, e.g., 120° or more. The captured scene comprises various objects, e.g., the sun (115), a first human subject (105), a second human subject (110), and tree (120). As will be illustrated and explained in greater detail below with reference to FIG. 3, the amount of distortion appearing in an object or subject in the captured scene depends on that object or subject's distance from the camera and its position within the wide camera's FOV. For example, objects closer to the periphery of the camera's FOV, such as sun (115) may experience more stretching/warping than an object closer to the center of the wide camera's FOV, such as tree (120).

According to some embodiments, a first one or more regions of interest (ROIs), e.g., human faces 125A and 125B, may be detected and tracked within the captured scene. Although the ROIs 125A and 125B in image 100 happen to be roughly the sizes of detected human faces in this example, it is to be understood that any desired type of object or combination of objects could be detected and tracked as an ROI, in a given implementation, e.g., a torso, a head, a particular sub-portion of a subject's face, a region containing a subject's head and shoulders, a coffee mug, etc., and each ROI could have its own distinct location and FOV within the captured scene. In some embodiments, a second ROI (130) may be determined to encompass all (or as much as possible) of the first ROI(s) within the image. According to some embodiments, the location and/or dimensions of second ROI 130 within wide FOV image 100 may be determined based on one or more predetermined framing rules. For example, it may be desired to attempt to center the one or more first ROIs at a particular location within the second ROI (e.g., centered horizontally and positioned at approximately ⅓ or ⅔ of the vertical extent of the second ROI, etc.).

Moreover, the dimensions of the second ROI may, e.g., be determined such that there is a particular required (or preferred) border or margin between one or more of: the extents of the first one or more ROIs (125) and the second ROI (130); the extents of the second ROI (130) and a determined first portion (135); and/or the extents of the second ROI (130) and the overall FOV of the wide FOV camera image (100). For example, in some cases, the location and/or dimensions of the second ROI could be determined as a parameterized function of the location and dimensions of a determined first portion (135), which first portion (135) may be used to generate an output image based on the current input wide FOV image 100.

In some embodiments, it may also be desirable to employ one or more delay timers in making the determination of updating the location and/or dimensions of second ROI 130 within wide FOV image 100. For example, in some implementations, the location and/or dimensions of second ROI 130 may be updated to be re-centered (and/or otherwise aesthetically re-framed, according to the predetermined framing rules of a given implementation) around the first one or more ROIs only after a certain threshold number, n, of seconds of relative "scene stasis" (e.g., as defined by less than a threshold amount of movement of the captured scene's one or more first ROIs over a predetermined sampling time) have passed.

In other words, if one or more first ROIs are still rapidly moving around the captured frame, or moving in and out of the frame quickly, etc., the use of delay timers will prevent the second ROI from changing locations and/or dimensions too rapidly, i.e., caused by very temporary or irregular movement around the scene by any of the one or more first ROIs being tracked, and thereby resulting in a jarring or jittery output video. On the other hand, if a first ROI has appreciably changed its size and/or location within the captured scene for more than the threshold amount of time, it then makes sense to begin to change the location and/or dimensions of the second ROI 130 to begin to contain and/or otherwise frame the one or more first ROIs, according to the predetermined framing rules.

As will be explained in greater detail below, when a determination is made to begin to change the location and/or dimensions of the second ROI 130 (and, by extension, the location and/or dimensions of the first portion 135), such changes may be made according to one or more smooth animation curves and/or via the use of a predetermined "pivot point," thus providing the "cinematic" feel to the changing FOV that is used (and distortion corrected) from the input wide FOV video image stream to produce an output video image stream.

As may now be more fully understood, determining an exact aesthetic portion to pull from a camera with non-linear movement and reprojection is difficult. Thus, in some embodiments, an approximate framing may be determined in a linear/rectangular space also referred to herein as "framing space." Framing space essentially refers to some subset of the wide FOV camera's FOV. In some embodiments, the framing space may be chosen, such that it is a rectangle in a spherical (or cylindrical) coordinate system that corresponds to a non-linear subset in the original image 100. Within that rectangle of framing space, various framing operations may be conducted in a linear fashion, even though, when translated back to the original image, they are not linear. It is to be understood that, by using a linear representation, certain operations may become much less computationally complex than if they had to be performed in the original input image space. As illustrated in FIG. 1, common element numerals correspond to one another, with element numerals without apostrophes corresponding the objects and regions as they appear in "input image space," and element numerals with apostrophes corresponding the objects and regions as they would appear in framing space, which may, e.g., be represented by a spherical coordinate system, such that a resulting linear/rectangular first portion determined in framing space (e.g., portion 135') may be mapped back to a corresponding non-linear "virtual camera" projection (135) in input image space. As used herein, the term "virtual camera" will be used to refer to the sub-portion of the wide FOV camera's captured image that will be used from of the input image, e.g., in the generation of a perspective-corrected output image, such as exemplary output image 150, illustrated in FIG. 1. In some embodiments, a virtual camera module could also take in other camera-related signals as input. For example, lens parameters, such as focal length, style of lens, etc., may also further influence how the identified sub-portion of the wide FOV camera's image may be used and/or modified in the generation of an output image. In other words, first regions of interest 125A and 125B in input image space (which correspond roughly to patches that would exist on the outer surface of a sphere) may be mapped to rectangular regions 125A' and 125B' in the perspective-corrected output image 150. Region 120 in input image space maps to region 120' in perspective-corrected output image 150, and region 115 in input image space does not appear in perspective-corrected output image 150, due the dimensions and location of determined first portion 135, as will be explained in further detail below.

Once the mapped first ROIs (i.e., represented by 125A' and 125B', in the example of FIG. 1) are determined in framing space, a second ROI (130') may be identified. As mentioned above, in some embodiments, the goal of the second ROI 130' may be to contain and/or otherwise frame the one or more first ROIs, according to the predetermined framing rules. In the example of FIG. 1, second ROI 130' is a rectangular region that includes both first ROIs 125A' and 125B', leaving some borders or margins between the extents of the first ROIs and the second ROI 130'. The second ROI 130' is also positioned, such that the first ROIs 125A' and 125B' are centered at a desired location within second ROI 130', in this case perhaps along a horizontal line extending across the second ROI 130' roughly ⅓ of the way up from its bottom edge. Of course, any framing rules are possible, depending on the desired aesthetics of a given system. By leaving a predetermined or configurable border or margin between the extents of the first ROI and the second ROI, the system may, in effect, dampen or delay the amount of movement or change in the location and dimensions of the ultimately determined first portion 135. For example, in some embodiments, the second ROI 130' may be configured to remain stationary unless or until at least one first ROI 125 being tracked by the system comes within a threshold distance (e.g., 100 pixels) of the present borders of the second ROI. In this way, the second ROI won't relocate until one (or more) of the first ROIs "push" it a substantial amount in one direction or another, at which point, the system may again apply its predetermined framing rules to re-center (or otherwise reframe) the one or more first ROIs within the newly-updated location and/or dimensions of the second ROI.

As mentioned above, the use of one or more delay timers may also be used in making the determination of when to update the location and/or dimensions of the second ROI. That is, in addition to the border threshold distance check, the system may also require that a first ROI be within the threshold distance of a border of the second ROI for a tunable threshold amount of time, e.g., 5 seconds, before updating the location and/or dimensions of the second ROI. In that way, if, say, human subject 110 moved a few feet farther away from human subject 105 for just 1 or 2 seconds, but then returned to his current position in image 100, the location and/or dimensions of second ROI 130 would not need to be updated, because the change in position of subject 110 would not have lasted for longer than the threshold amount of time. On the other hand, if subject 110 moved away from subject 105 for greater than the threshold amount of time, the system could begin to smoothly and gradually update the location and/or dimensions (e.g., increasing the size of second ROI 130 to loop in subject 110 again) to accommodate the new farther-away standing position of subject 110.

Although shown in FIG. 1 in the context of an image having two discrete, non-overlapping first ROIs, in practice, the same second ROI movement dampening techniques described above may be applied with only a single ROI (e.g., a single human subject), as well. In other words, a very brief movement of the single human subject to another side of the captured scene (or a rapid change in the distance of the single human subject to the camera) may not result in any immediate changing of the location and/or dimensions of the second ROI. However, if the single human subject were to re-establish themselves at a new position (or a new distance) within the scene for longer than the threshold amount of time, the second ROI (and, by extension the overall determined portion of the input image) could again begin to smoothly and gradually update the location and/or dimensions (e.g., increasing the size of second ROI 130) to accommodate the newly-established position of the single human subject, again according to the desired predetermined framing rules.

For any given image (or regions of an image) represented in a rectangular framing space, once the location and dimensions of a second ROI 130' are determined, a first portion 135' may be determined based on the determined location and dimensions of the second ROI 130', again according to any desired predetermined framing rules. For example, a first portion 135' having position (x, y) and size (w, h) within framing space may correspond to a second ROI 130' that is a rectangle located at position: (x+w/2−w*A/2, y+w*B) and having dimensions: (w*A, h*C) within framing space, wherein A, B, and C are parameters that can be configured to change the relative relationship between the size and dimensions of the first portion 135' and the size and dimensions of the second ROI 130' for any given frame. In some embodiments, the aspect ratio of the first portion may be a function of the first portion's width and/or the desired output image's desired aspect ratio.

Once the desired first portion 135' is determined in framing space, its location (e.g., in the terms of a center point, top-left corner point, etc.) and dimensions (e.g., in terms of a diagonal field of view, a width/height, etc.) may be mapped back to the input image space, so that a virtual camera direction and field of view may be determined to "point" or "pan" a virtual camera to the region in input image space that has been determined as the first portion 135 to pull from the wide FOV camera for the current frame being processed. Finally, at step 140, any necessary perspective distortion correction (as will be described in greater detail below, e.g., with reference to FIG. 2B) may be applied to the first portion 135, resulting in an aesthetically-framed and perspective-corrected final output image 150.

As may now be understood, final output image 150 is the result of: tracking one or more relevant first ROIs in the input image; making intelligent framing decisions based on the location(s) and size(s) of the relevant first ROIs being tracked and any predetermined framing rules (as well as the application of any desired motion dampening rules to the updated position of a framed portion from a previous frame); and the application of perspective distortion corrections to account for distortions that may be introduced by the fact that the final output image 150 is being taken from a particular location within a wide FOV camera's capture.

As illustrated in FIG. 1, the distortion and "stretching" effect in subjects 105' and 110' faces in output image 150 is greatly reduced from the amount of distortion they had at 105 and 110 in input image 100. The reduction in distortion of tree 120' is illustrated as being less pronounced, as tree 120 was closer to the center of the original wide image's FOV, where objects experience less distortion. Moreover, large and irrelevant portions of the FOV of original image 100, e.g., the sky and sun 115, have been cropped out from the final output image 150, as they were not identified as having any relevant ROIs worth tracking.

Figure 2A:
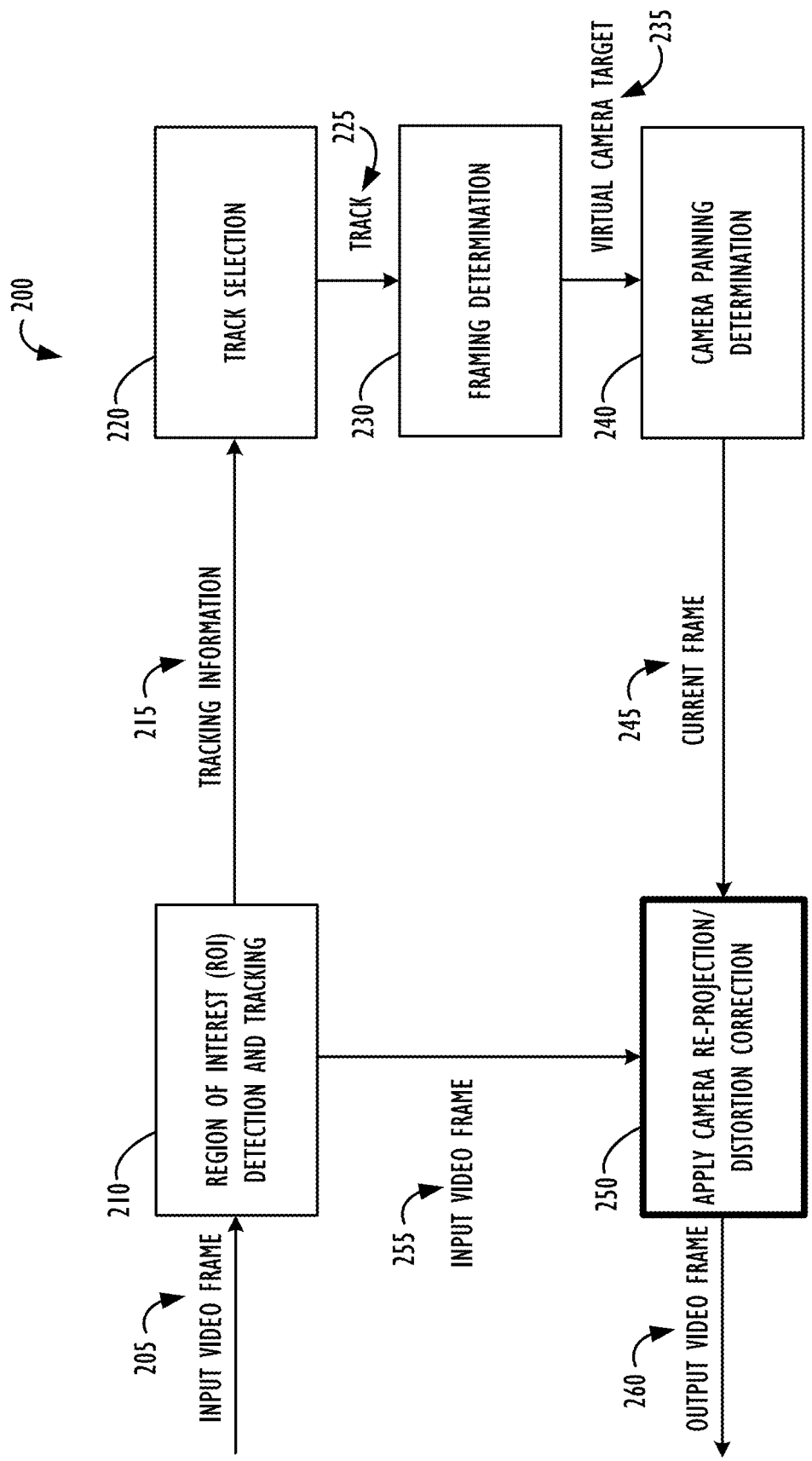
FIG. 2A illustrates an exemplary system diagram for wide FOV image framing, virtual camera panning, and distortion correction, according to one or more embodiments.

System for Wide FOV Image Region of Interest (ROI) Tracking, Framing, Virtual Camera Panning, and Distortion-Correction Turning now to FIG. 2A, an exemplary system diagram 200 for wide FOV image framing, virtual camera panning, and distortion correction is shown, according to one or more embodiments. As outlined above with reference to the example illustrated in FIG. 1, the "cinematic" framing systems 200 described herein may begin operations by receiving an input video image frame (205). Within the input image frame, block 210 may perform region of interest (ROI) detection and tracking of one or more regions of interest within the image. As mentioned above, various parameters may be tuned for a given implementation, as to what constitutes an ROI, what types of objects the system is interested in tracking, and any size/quality/duration requirements imposed by the system to justify the continued tracking of a given ROI.

In some implementations, block 210 may be used to perform one or more of the following operations: 1) transforming ROI detection box coordinates from input image space coordinates to framing space coordinates; 2) matching face detection ROIs with corresponding body detection ROIs, e.g., so that an overall 'person' ROI box may be determined (in the event that there are unmatched faces/bodies detected in the scene, they may be matched up with synthetic estimated bodies/faces, such that a reasonable overall body detection box for the subject may be estimated); 3) temporally smoothing the changes in size and/or location of individual ROI detection boxes (e.g., using Kalman filtering); 4) estimating individual ROI detection box velocities (e.g., how fast a given ROI detection box is changing in an x-axial direction, in a y-axial direction, and/or in size, also referred to herein as the z-axial direction); and even 5) estimating whether individual ROI detection boxes are moving or not (e.g., based on their estimated velocities). The tracking information (215) that is ultimately generated by block 210 may then be passed to track selection block 220.

Track selection block 220 may apply various logical rules, including any desired predetermined tracking rules or heuristics, to determine which tracked ROIs should be included in framing decisions to be made by the system. For example, in some embodiments, face-based ROIs with a face size less than a first threshold, threshold1, are simply not tracked. In some such embodiments, face-based ROIs that were previously tracked but now have a face size less a second threshold, threshold2 (wherein threshold2 may be less than threshold1) are dropped from tracking. In this example, having two tracking box size thresholds may assist the system in avoiding undesirable boundary conditions, e.g., wherein a given ROI is constantly included and excluded from consideration in the framing determination process, due to rapid fluctuations or "noise" in the detected face size from frame to frame as the scene composition, scene lux value, and/or overall quality level changes.

In some embodiments, other tracking rules could be applied, e.g., ROI tracks that would require the virtual camera to zoom out beyond a first zoom threshold (i.e., causing the framed region to become too large relative to the overall wide camera FOV) may not be tracked. Similarly, ROIs that were previously tracked but would require virtual camera to zoom out beyond a second zoom threshold even larger than the first zoom threshold may also be dropped from the tracking operation.

In still other embodiments, when there's at least one stationary ROI in the captured scene, then all other ROIs that have been moving for more than a threshold amount of time may be dropped from the tracking operation. For all other moving ROIs (e.g., those that only just began to move, say), the ROIs last stationary position may be used for the subsequent framing decisions. If no ROIs are found that meet the system's tracking criteria, the virtual camera view may smoothly transition back from wherever its current location and dimensions are to the center of the wide FOV camera's FOV, e.g., with a default FOV.

Various other heuristics are also possible to implement in track selection block 220, e.g., ignoring individual subjects or ROIs based on their visual visibility/quality, or ignoring all subjects or ROIs based on an estimated scene lux value, etc.

The tracking information regarding the selected ROI tracks (225) that is ultimately generated by block 220 may then be passed to framing determination block 230.

The role of framing determination block 230 has been introduced above with respect to FIG. 1 and the determination of the exemplary second ROI 130 and first portion 135 of the input image, from which an output image may be generated. In particular, the framing determination block 230 will determine dimensions and locations of an aesthetically-chosen portion of the wide FOV camera in a linear framing space, e.g., according to one or more predetermined framing rules, and then map the determined portion back to input image space and create a perspective distortion-corrected version of the determined portion (with potential modifications to exclude any invalid pixels, i.e., pixel location mapped back to input image space for where the camera does not have any captured image data, e.g., the "black" corner regions of image 100 in FIG. 1, as will be explained further below with reference to FIG. 5E). The so-called "virtual camera target" information, i.e., the information specifying the location and/or dimensions of the target determined portion from the wide FOV camera (235) that is ultimately generated by block 230 may then be passed to camera panning determination block 240.

Camera panning determination block 240 may serve a role of smoothly and intelligently shifting the view of the virtual camera for the previous input video frame towards the virtual camera target determined for the current input video frame. In particular, the camera panning determination block 240 may determine how to shift the second ROI from its current position towards the virtual camera target determined for the current input video frame according to one or more animation curves. The one or more animation curves may comprise a horizontal displacement curve; a vertical displacement curve; and/or a zoom curve. For each axial direction of virtual camera panning movement governed by an animation curve (e.g., horizontal, vertical, and/or zoom), the respective animation curve may be parameterized by at least one of: an acceleration value; a time value; or an animation constraint value. This would allow the system to, e.g., on every new frame, independently apply an amount of acceleration to a particular axial direction animation curve to make sure that camera pans towards its framing goal at a desired rate and smoothness.

For example, if $a_x$ represents an amount of acceleration to apply to the movement of the current virtual camera position towards the framing goal in the x-axial (e.g., horizontal) direction, and $\Delta t$ represents the amount of time passed since the last image frame, and $v_x$ represents the velocity of the virtual camera in the x-axial direction for the current image frame, then the velocity of the virtual camera in the x-axial direction after the time, $\Delta t$, may be represented as: $v_x'=v_x+a_x\Delta t$, while the position of the virtual camera in the x-axial direction after the time, $\Delta t$, may be represented as: $x'=x+v_x'\Delta t$. Similar determinations may be made in the other axial directions (e.g., the y-axial direction and the z-/zoom axial direction) for each frame. As may now be understood, depending on the animation curves used, and the distance between the virtual camera's present location and its target location, the virtual camera may or may not arrive all the way at its target location within the duration of one captured input video image frame. Instead, it may take the virtual camera a number of frames to reach its target location, moving only a portion of the way to its target location with each successive frame. Of course, the target location itself could continually be updated with each captured frame, based on the composition of the scene, so the virtual camera will constantly be looking to update its target location and moving towards its target according to its specified animation curves—even if it never actually reaches its target location goal.

If the determined target location for a given frame remains the same (or within a threshold delta) of the virtual camera's current location, then no movement or panning of the camera is necessary for the given frame. As mentioned above, in certain embodiments, the use of delay timers may also be helpful to avoid unwanted or over-movement. In other words, a delay timer of, say, 5 seconds may be set before an updated virtual camera target location actually results in the panning or movement of the virtual camera location. This would allow for brief and/or temporary changes in scene composition to not be interrupted with hurried or jerky apparent camera movement to attempt to accommodate the temporary change in scene composition. However, if the camera target location stayed beyond a threshold delta away from its current location for longer than the setting of the delay timer, the camera panning determination block 240 could begin to institute the movement of the virtual camera position according to one or more animation curves, as described above, by updating the location and/or dimensions of the framed portion being pulled from the current input video image frame.

If desired, particular animation constraints may independently be applied to each axial direction of movement. For example, a panning constraint may comprise an interval of allowed values (e.g., defining minimum and/or maximum permissible velocity and/or acceleration values in one or more axial directions). As another example, acceleration and/or velocity constraint curves may be applied to the movement in one or more axial directions. For example, effects comparable to traditional ease-in, ease-out, or ease-in-out Bezier animation curves may be employed, as desired, to further smooth the "cinematic" movement of the virtual camera. For example, an ease-in curve may limit the acceleration or velocity of the virtual camera at the beginning of a movement to a target location, but ease that constraint as the virtual camera approaches its target location (i.e., when velocity is low, acceleration towards target is low); an ease-out curve may limit the acceleration or velocity of the virtual camera at the end of its movement to a target location (i.e., when displacement to target is small, velocity towards target is low); and an ease-in-out style curve may limit the acceleration or velocity of the virtual camera at both the beginning and ends of its movement towards a target location.

Other types of animation constraints are also possible. For example, constraints on velocity as a function of the virtual camera's current distance to the edges of framing space may be employed to ensure that virtual camera slows down as it approaches the boundaries of the field of view of wide FOV input camera. Likewise, constant constraints on acceleration and/or velocity may be used to ensure that the panning is never too jerky or too fast.

As may now be understood, these various animation constraints allow for customized tuning of the motion in each of virtual camera's axial directions independently. For example, in some cases, it may be desired that zooming in should be done relatively slowly (i.e., the max permitted velocity in the negative z-axial direction should be small in absolute value) compared to zooming out. In other cases, it may also be desirable that zooming (i.e., movement in the z-axial direction) should be done relatively faster than panning (i.e., movement in the x- or y-axial directions), e.g., to avoid unintentionally cropping out all or a portion of a new subject or other ROI that has entered the scene on the opposite side of the FOV from a current ROI, and that the virtual camera needs to grow in size (and/or move across the FOV) to accommodate.

The framing information for the current input video image frame, i.e., the information specifying the location and/or dimensions of the portion of the wide FOV camera (245) that is ultimately generated by block 240 may then be passed to camera re-projection/distortion correction block 250.

At camera re-projection/distortion correction block 250, one or more forms of appropriate camera projection and/or distortion correction may be applied the current input video frame (255) using the determined location and/or dimensions (e.g., in terms of a horizontal FOV, a vertical FOV, and/or a diagonal FOV) of the portion requested for the current input video image frame (245). In some embodiments, other parameters could also be given to the re-projection/distortion correction block 250, such as desired focal length (or other lens parameters) for the virtual camera to simulate in the current output video frame (e.g., depending on whether there are people present and, if so, how far away from the camera they are estimated to be). In other embodiments, one or more content-specific distortion correction models could also be employed and combined, e.g., based on the content within the determined portion of the wife FOV image (e.g., a distortion correction model tuned specifically for architecture, or a distortion correction model tuned to reduce distortion in certain types of animal faces, etc.) As will be illustrated in more detail, e.g., with respect to FIGS. 2B and 4, according to some embodiments, the position of the virtual camera may be rotated (and, if requested, zoomed) to the location and/or dimensions of the determined portion in input image space, and then re-projected into linear framing space to form a planar output video image frame (260) that may then be displayed, stored, and/or transmitted to another device (e.g., in the case of a videoconferencing application), as is desired.

Figure 2B:
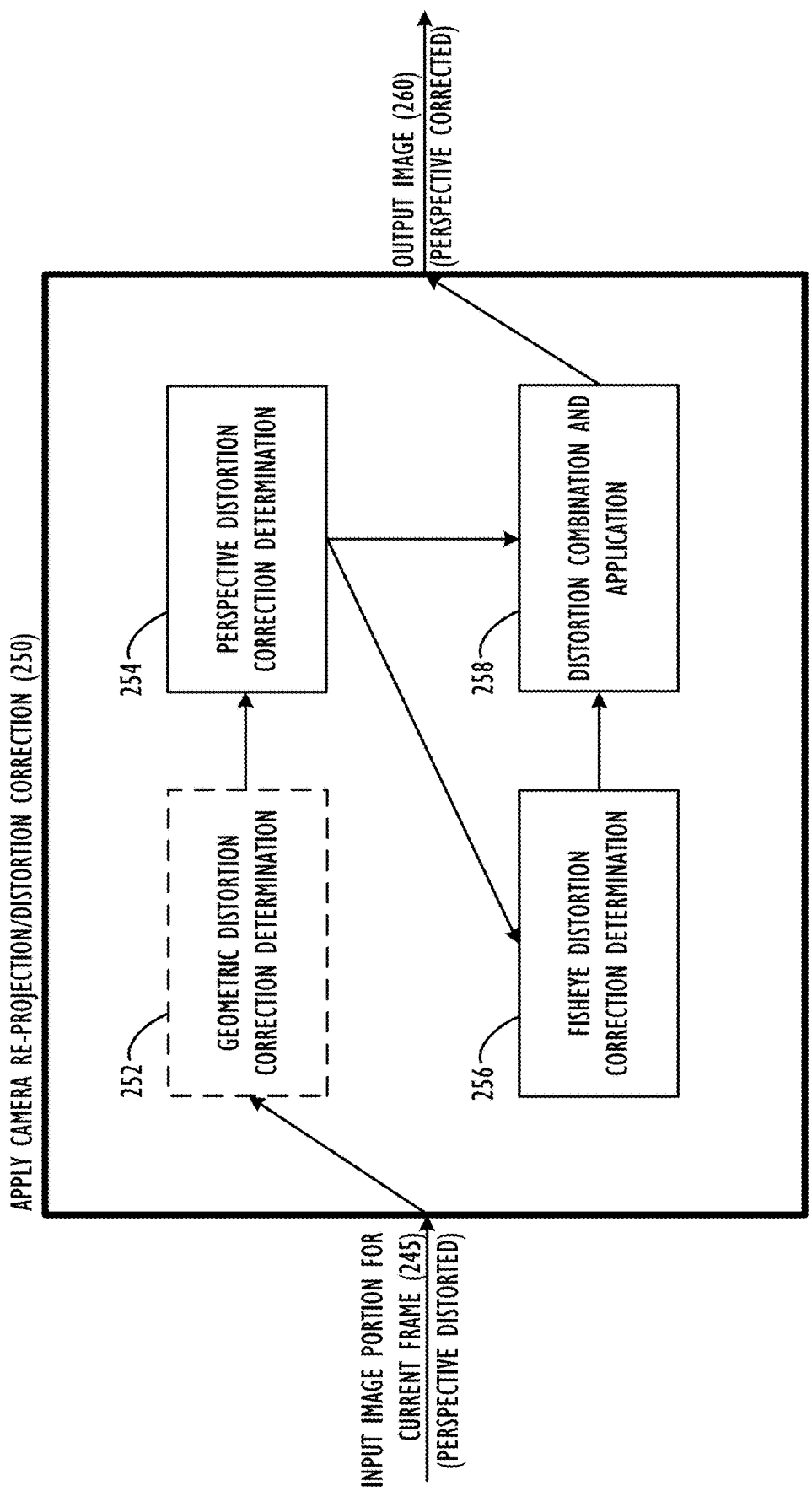
FIG. 2B illustrates an exemplary system diagram for a camera projection and distortion correction sub-system, according to one or more embodiments.

Turning now FIG. 2B, an exemplary system diagram for the camera projection and distortion correction sub-system 250 is shown in greater detail, according to one or more embodiments. As described above with reference to FIG. 2A, an input image portion for the current input video image frame 245 may be sent to the camera re-projection and distortion correction sub-system 250. Based on that input image portion, sub-system 250 may then optionally determine a set of geometric distortion corrections for the input image portion at block 252. Geometric distortions corrections may be used to correct for the overall geometry of the scene captured in the input image portion and keep straight lines straight. There are three typical types of geometric distortions: barrel, pincushion, and mixed. Geometric distortion is typically determined based on the lens/camera design and is independent of the content or make up of any individual scene being captured. As such, geometric distortion models (e.g., as defined by polynomial functions) are typically calibrated in factory or at setup time and then applied at runtime (i.e., when a camera actually captured a photo 'in the wild').

Next, at block 254, a set of perspective distortion corrections may be determined for the geometric distortion-corrected version of the input image portion based, at least in part, on its location and FOV within the current image form the wide FOV video image stream. For example, according to some embodiments, the perspective distortion corrections applied to the input image portion may comprise a relatively simply global transformation (i.e., that applies the same transformation to all pixels in the input image portion), such that it may be performed under the low-latency and low-power requirements of video streaming and videoconferencing applications on portable integrated computing devices.

According to one embodiment of the perspective distortion correction determination block 254, is defined, such that: the input image portion comprises a rectangle in framing space (e.g., a spherical or cylindrical coordinate space) that may be defined by the coordinates: [x1, x2, y1, y2], and the camera projection matrix, P, may be determined by the principal point ($O_x$, $O_y$), and a focal length, f. Then, the output of the perspective distortion correction determination block 254 will be the determined perspective transformation, e.g., as defined by the projection matrix, P.

To determine the perspective transformation, block 254 may perform the following steps:

Step 1. Calculate a shift vector as follows:

$$T_x = (x1+x2)/2 - O_x; \text{ and}$$

$$T_y = (y1+y2)/2 - O_y.$$

Step 2. Calculate a rotation vector (i.e., to perform a virtual panning operation) as follows:

$$\theta_x = \arctan(T_y/f);$$

$$\theta_y = \arctan(T_x/f);$$

$$\theta_z = 0.$$

Step 3. Calculate the 3×3 Rotation matrix, R, from the rotation vector.

Step 4. Calculate the 3×3 perspective transform, T, from the rotation matrix, R, as follows:

$$T = P * R * \text{inverse}(P).$$

In other embodiments, the perspective transformation equation of Step 4 can also involve different projection matrices, i.e., P values, e.g., taking the form: $T = P_{virtual} * R * \text{inverse}(P_{original})$/where $P_{original}$ is a projection matrix determined by the input camera's calibration parameters, and $P_{virtual}$ is a projection matrix that can be controlled (e.g., changing the value of f to mimic a camera with a different focal length, etc.).

Step 5. Apply the calculated perspective transformation, T, to the image.

As may now be understood, the global projection matrix, P, may be defined by the 3×3 rotation matrix having values of:

$$\begin{matrix} f & 0 & Ox \\ 0 & f & Oy \\ 0 & 0 & 1 \end{matrix}$$

As illustrated in FIG. 2B, the output of block 254 may be sent to both fisheye distortion correction determination block 256 and distortion combination and application block 258, as will be described in further detail below.

Turning now to fisheye distortion correction determination block 256, assume that: for each input pixel, (x, y), of the perspective distortion corrected-version of the input image portion data, there is a parameter, k and an output pixel, (x', y'). The center of the perspective distortion-corrected portion of the original input image may be denoted by ($c_x$, $c_y$). A global fisheye projection transformation for each pixel may then be calculated, according to the following equations:

$$r^2 = (x-c_x)*(x-c_x) + (y-c_y)*(y-c_y);$$

$$\text{scale} = 4k/(4k*k-r^2);$$

$$x' = c_x + (x-c_x)*\text{scale; and}$$

$$y' = c_y + (y-c_y)*\text{scale}.$$

As may now be appreciated, the amount of fisheye projection distortion correction applied to each pixel increases as the radial distance of the pixel to the center of the image increases. In some embodiments, a stereographic fisheye projection in particular may be chosen as the fisheye projection, although it is to be understood that other types of fisheye projections could be selected, to fit the needs of a given implementation and/or scene type.

At distortion combination and application block 258, the perspective distortion corrected-version of the input image portion data from block 254 and the fisheye distortion corrected-version of the input image portion data from block 256 may be combined in any desired fashion (along with any other forms of desired distortion correction, as will be explained below) to produce a perspective distortion-corrected output image 260. The amount of contribution of the fisheye distortion correction to the combined distortion correction may generally scale with the FOV of the input image portion. For example, it has been empirically determined that for, input image portions with FOVs less than roughly 70°, perspective distortion (e.g., as determined by block 254) alone may be sufficient to correct distortions in the input image portion. Whereas, for input image portions with FOVs greater than roughly 70°, it may also be helpful to include, at least in part, the fisheye distortion corrections (e.g., as determined by block 256) in order to reduce the overall amount of distortion in the output image.

According to some embodiments, the amount of each type of distortion correction that is applied to the input image portion may be mixed based on the desired FOV of the output image, such that there is a smooth transition in the appearance of the images, e.g., as the FOV of the output video image stream changes over the course of the output video image stream. For example, according to one exemplary embodiment implementing a fisheye distortion or stereographic barrel distortion, the mixing parameters may be dynamically modified as a function of the output image's desired FOV, parameterized by a value, f, according to the following equations, using a blend parameter, α:

$$r_{stereographic} = f \cdot \tan(\theta/2); \text{ and}$$

$$r_{final} = r_{stereographic} \cdot \alpha_1 + r_{original} \cdot \alpha_2,$$ wherein the sum of $\alpha_1 \ldots \alpha_n = 1$. It is to be understood that additional elements could be included in the linear blending operation to compute $r_{final}$. For example, if a given implementation has additional models that can compute distortion that improves how pets, architecture, human faces, etc., look in the final image, they could also be included in the linear blending operation.

In addition to dynamically modifying distortion parameters based on virtual camera lens parameters, in some embodiments, as explained further below with reference to FIGS. 5C and 5D, projection and distortion correction sub-system 250 may also attempt to correct for device tilt during the capture of the input image, which could cause the camera output to look tilted and/or cause jarring results when implementing camera panning operations, e.g., in accordance with block 240.

In particular, in some cases, a direction of a gravity vector (e.g., as sampled from an accelerometer or other positional sensor associated with the image capture device) may be calculated for a current output image in the output image space coordinates. Then, the output image may be additionally rotated, as necessary, to ensure that gravity is pointing directly downwards with respect to the output image.

Finally, as will be illustrated in greater detail below with reference to FIG. 5E, in the event that the determined perspective distortion corrections cause the presence of one or more invalid pixels in the projected image, sub-system 250 may determine a final FOV correction by determining the FOV closest to requested output image FOV value that would have no invalid pixels if the virtual camera was centered at wide FOV input image's center (i.e., where the virtual camera can have the largest FOV without encompassing invalid pixels), e.g., using a binary search operation. Then, subsystem 250 could proceed to reduce the virtual camera FOV to the determined largest possible FOV without encompassing invalid pixels, and then determine a smallest shift (e.g., towards input image's center, using a binary search operation) from the requested virtual camera center point that ensures that no invalid pixels will be present in the output image projection. In other words, subsystem 250 could shift the virtual camera as little as possible to avoid showing invalid pixels in the output image. This final step of correcting for potential invalid pixels allows the framing operation to be greatly simplified (i.e., by being initially approximated in a linear framing space), thereby conserving limited processing and power resources, e.g., as may be available in a portable personal electronic device producing an aesthetically-framed and distortion-corrected version of a wide FOV output video image stream in real-time.

Examples of Perspective Distortion in Wide FOV Cameras

Figure 3:
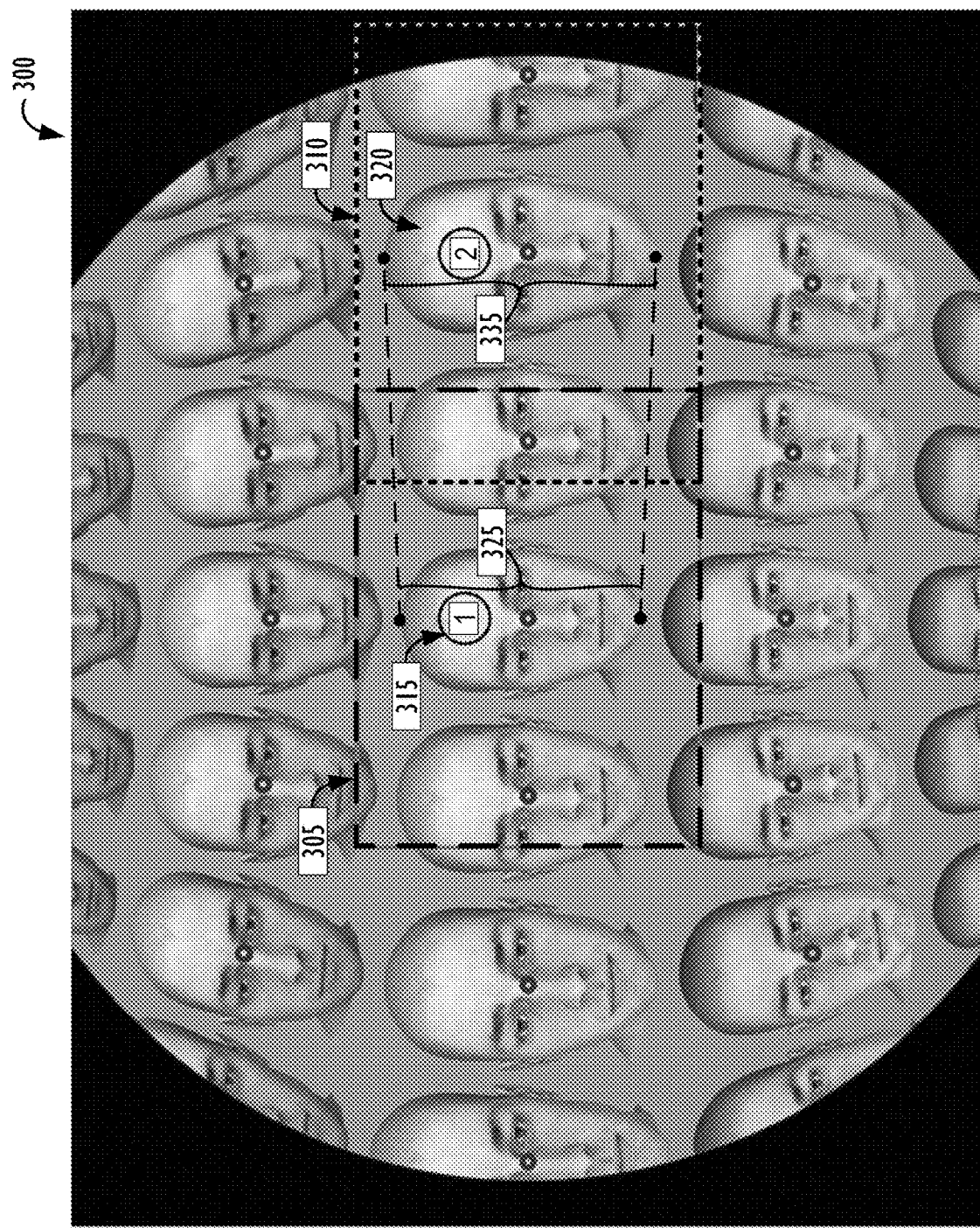
FIG. 3 illustrates an example of distortions at various places across a wide FOV camera lens, according to one or more embodiments.

Turning now to FIG. 3, an example 300 of distortions at various places across a wide FOV camera lens is shown, according to one or more embodiments. In example 300, the same human face is replicated at various places across the camera's FOV to demonstrate the relative distortions that will be experienced at different places within the camera's FOV. For example, the human face 1 (315) is centered in exemplary box 305 (which is closer to the center of the camera's FOV), and the human face 2 (320) is centered in exemplary box 310 (which is closer to the periphery of the camera's FOV). An exemplary corresponding head-to-chin measurement has been marked in both human face 1 (315) and human face 2 (320). As illustrated, head-to-chin measurement 335 for human face 2 (320) is significantly larger than head-to-chin measurement 325 for human face 2 (315). This is consistent with the expectation that, in a wide FOV camera, objects closer to the periphery of the FOV will begin to become stretched and/or warped. Thus, as may be understood, additional perspective distortion correction may be needed for images in an output video image stream that are taken from regions closer to the periphery of the wide camera FOV and/or larger images, generally, that are taken from the wide camera FOV. Also illustrated in FIG. 3 is the principle that image portions taken from closer to the periphery of the wide camera's FOV, e.g., exemplary box 310, may include one or more invalid pixels (i.e., the black pixels on the right side of exemplary box 310). In some embodiments, if a determined portion includes one or more invalid pixels, one or more adjustments may be applied to the determined portion (e.g., reducing a size of the determined portion and/or shifting the determined portion back towards the center of the wide FOV camera's FOV) to exclude any invalid pixels from a generated output video image stream.

Perspective Re-Projection Example

Figure 4:
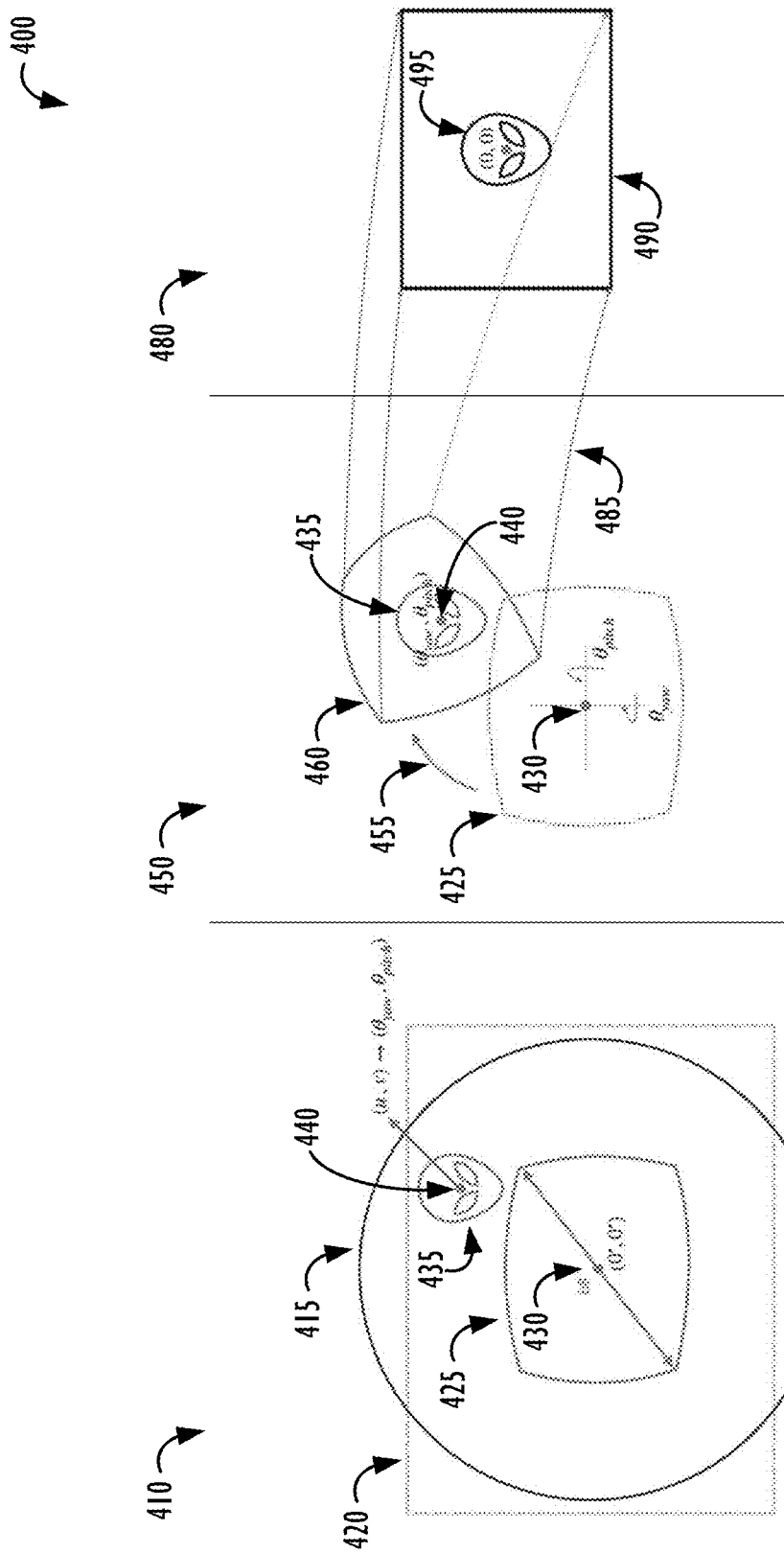
FIG. 4 illustrates an example of spherical image rotation and re-projection to a linear coordinate space, according to one or more embodiments.

Turning now to FIG. 4, an example 400 of spherical image rotation and re-projection to a linear coordinate space is shown, according to one or more embodiments. Image 410 illustrates an example of a cross-sectional plane (420) view of a spherical input image space (415). The spherical input image space 415 in this example may, e.g., represent the FOV of a wide FOV camera, e.g., a camera having an FOV of 120° or more. In this example, a central point 430 has been defined, having spherical coordinates of (0°, 0°), that is, a yaw rotation of 0° and a pitch rotation of 0°, and a "default" diagonal field of view of 68° (425). Central point 430 may also be thought of as the optical center of the input camera. In the example of image 410, there is a region of interest (e.g., face 435) that the system wishes to "point" the virtual camera at, e.g., for the purpose of creating a planar, perspective-corrected output image from the wide input image's FOV for use in a videoconferencing application or the like. ROI 435 is centered at a location that may be represented by a central point 440, having spherical coordinates of ($\theta_{yaw}$, $\theta_{pitch}$), that is, a yaw rotation of $\theta_{yaw}$ degrees and a pitch rotation of $\theta_{pitch}$ degrees from the central point 430. In a spherical (or cylindrical) "framing" image coordinate system, those rotations may correspond to a coordinate value of (u, v). As will be explained below, in some embodiments, a goal of the cinematic framing system may be to "rotate" the point 440 from its current coordinates of ($\theta_{yaw}$, $\theta_{pitch}$) to be at the camera center point 430 coordinates of (0, 0). To do so, the system may apply an inverse rotation of $-\theta_{yaw}$ radians around the vertical axis of the coordinate system, after which, the point 440 should have coordinates (0, $\theta_{pitch}$). The system may then apply an inverse rotation around the horizontal axis of the coordinate system of $-\theta_{pitch}$ radians (Note: the signs of rotation angles might differ, depending on how the yaw and pitch values are defined in a given coordinate space). As a result of this second rotation, the point 440 will be located at (0, 0). In some coordinate systems, the order that the rotations are applied in may matter. This can be summarized with a rotation matrix R, defined as $R_{yaw}*R_{pitch}$. By selecting both framing space and the desired rotations to be in the same spherical coordinate system, the necessary rotations may be applied in framing space by using the (u, v) coordinates. In a more general case, e.g., where framing space may be in a different coordinate system, such as rectangular coordinates, the location of the center point 440 of the ROI 435 may first need to be converted into a corresponding spherical coordinate system before it may be rotated.

Image 450 illustrates an example of rotating (arrow 455) a central (or default) FOV (425) to the determined portion's location (460) and FOV that is centered on ROI 435's central point 440. The location (and/or FOV) of portion 460 for ROI 435 may be determined by an intelligent framing algorithm, such as those described above. It is to be understood that the FOV of portion 460 may also be larger or smaller than the default or central FOV 425, depending on the output of the framing algorithm. Once the desired portion of the input image FOV (460) is determined, it may be rotated back to the center of the camera's FOV and re-projected (arrow 485) into a planar output image coordinate system (also referred to herein as "output image space") to generate a planar and perspective-corrected output image 490, including the newly-centered (and distortion-corrected) ROI 495, as described in greater detail above, with reference to FIG. 2B. In some embodiments, this task of centering and re-projecting a ROI into a planar output image coordinate system may be performed in a single mathematical operation. For example, assuming the camera's re-projection/distortion correction module receives three parameters (i.e., $\theta_{yaw}$, $\theta_{pitch}$, and a desired FOV) as input, then, for every point in the input image, it may compute the corresponding spherical coordinates, e.g., (x, y). (Note that appropriate input camera calibration data may be needed for this operation.) The re-projection/distortion correction module may then change the points according to the following operation: ($\theta^{-1}_{yaw}$, $\theta^{-1}_{pitch}$) (x, y). Finally, all points may be projected back into the planar output image 490. (Note that appropriate virtual camera calibration data may be needed for this operation.)

Figure 5A:
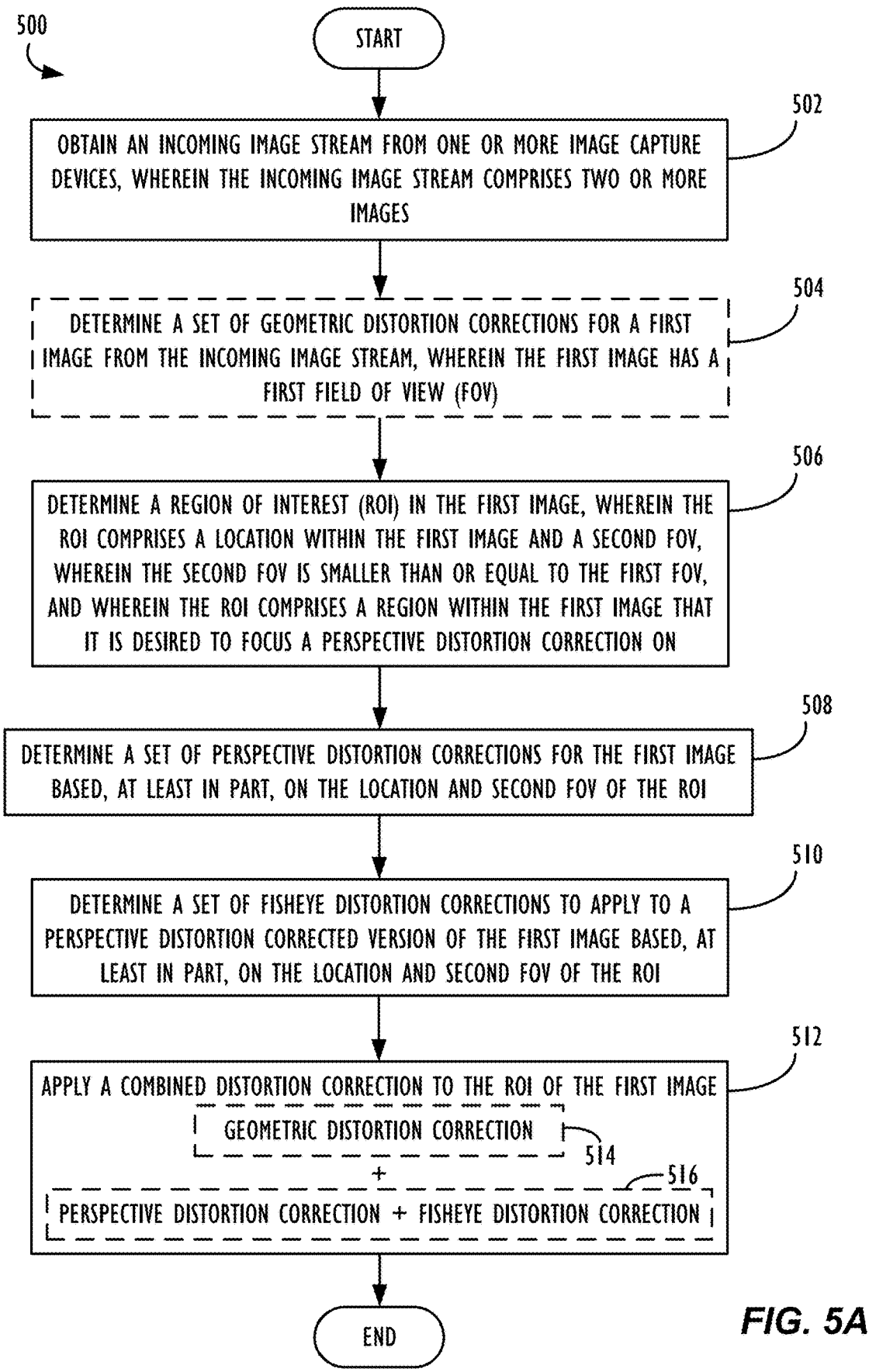
FIG. 5A is a flow chart illustrating a method of applying perspective distortion correction to a wide FOV image, according to various embodiments.

Exemplary Methods of Efficient Application of Perspective Distortion Correction to a Wide FOV Image FIG. 5A is a flow chart 500, illustrating a method of applying perspective distortion correction to a wide FOV image, according to various embodiments. First, at Step 502, the method 500 may obtain an incoming image stream from one or more image capture devices, wherein the incoming image stream comprises two or more images. Next, at Step 504, the method 500 may optionally determine a set of geometric distortion corrections for a first image from the incoming image stream, wherein the first image has a first field of view (FOV). (For example, in some embodiments, geometric distortion correction may not be needed if an FOV is particularly small and/or very near the center of the camera's FOV.) Next, at Step 506, the method 500 may determine a region of interest (ROI) in the first image, wherein the ROI comprises a location within the first image and a second FOV, wherein the second FOV is smaller than or equal to the first FOV, and wherein the ROI comprises a region within the first image that it is desired to focus a perspective distortion correction on. As described above, the ROI, in this context, may also be a sub-portion of the first image determined to contain (and, optionally, frame according to one or more predetermined framing rules) two or more individual, smaller ROIs. In other words, the ROI referred to in Step 506 refers to the portion of the first image that the method 500 has determined to perspective correct in order to generate an output image, e.g., for inclusion into an aesthetically-framed output video image stream.

Next, at Step 508, the method 500 may determine a set of perspective distortion corrections for the first image based, at least in part, on the location and second FOV of the ROI, e.g., as described in greater detail above with reference to FIGS. 2A and 2B. Next, at Step 510, the method 500 may determine a set of fisheye distortion corrections to apply to a perspective distortion corrected version of the first image based, at least in part, on the location and second FOV of the ROI, e.g., as described in greater detail above with reference to FIGS. 2A and 2B. Finally, at Step 512, the method 500 may apply a combined distortion correction to the ROI of the first image. As described in greater detail above with reference to FIGS. 2A and 2B, in some embodiments, this may comprise applying the set of determined geometric distortions (Step 514) and also applying a combination of the determined set of perspective distortion corrections and the determined set of fisheye distortion corrections (Step 516), e.g., based on the requested second FOV of the ROI of the current first image from the incoming image stream. In some embodiments, the combination may further comprise a weighted average between the determined set of perspective distortion corrections and the determined set of fisheye distortion corrections (and any other desired types of distortion corrections that the system may have models for), e.g., wherein the respective weightings are based on the size of the requested second FOV of the ROI of the current first image from the incoming image stream, the content of the scene in the current first image, etc.

Figure 5B:
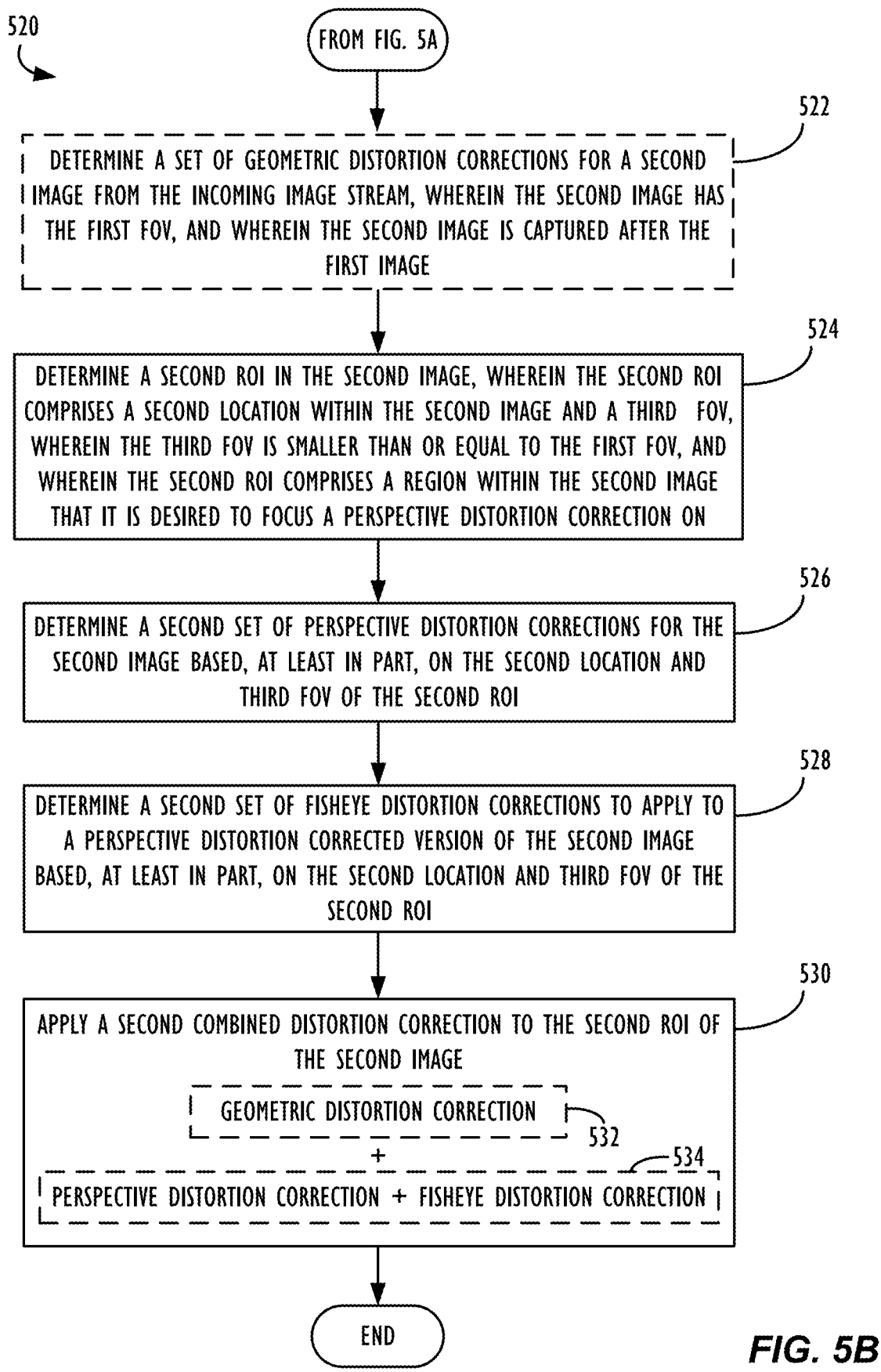
FIG. 5B is a flow chart illustrating a method of applying perspective distortion correction to a wide FOV video image stream, according to various embodiments.

FIG. 5B is a flow chart 522, illustrating a method of applying perspective distortion correction to a wide FOV video image stream, according to various embodiments. First, at Step 522, the method 520 optionally determine a set of geometric distortion corrections for a second image from the incoming image stream, wherein the second image has the first FOV, and wherein the second image is captured after the first image. Next, at Step 524, the method 520 may determine a second ROI in the second image, wherein the second ROI comprises a second location within the second image and a third FOV, wherein the third FOV is smaller than or equal to the first FOV, and wherein the second ROI comprises a region within the second image that it is desired to focus a perspective distortion correction on. As described above, the second ROI, in this context, may also be a sub-portion of the second image determined to contain (and, optionally, frame according to one or more predetermined framing rules) two or more individual, smaller ROIs. In other words, the second ROI referred to in Step 524 refers to the portion of the first image that the method 520 has determined to perspective correct in order to generate an output image, e.g., for inclusion into an aesthetically-framed output video image stream.

Next, at Step 526, the method 520 may determine a second set of perspective distortion corrections for the second image based, at least in part, on the second location and third FOV of the second ROI, e.g., as described in greater detail above with reference to FIGS. 2A and 2B. Next, at Step 528, the method 520 may determine a second set of fisheye distortion corrections to apply to a perspective distortion corrected version of the second image based, at least in part, on the second location and third FOV of the second ROI, e.g., as described in greater detail above with reference to FIGS. 2A and 2B. Finally, at Step 530, the method 520 may apply a second combined distortion correction to the second ROI of the second image. As described in greater detail above with reference to FIGS. 2A and 2B, in some embodiments, this may comprise applying the set of determined geometric distortions (Step 532) and also applying a combination of the determined set of perspective distortion corrections and the determined set of fisheye distortion corrections (and any other desired types of distortion corrections that the system may have models for) (Step 534), e.g., based on the requested second FOV of the ROI of the second image from the incoming image stream, the content of the scene in the second image, etc.

Accounting for Device Tilt during Perspective Distortion Correction

Figure 5C:
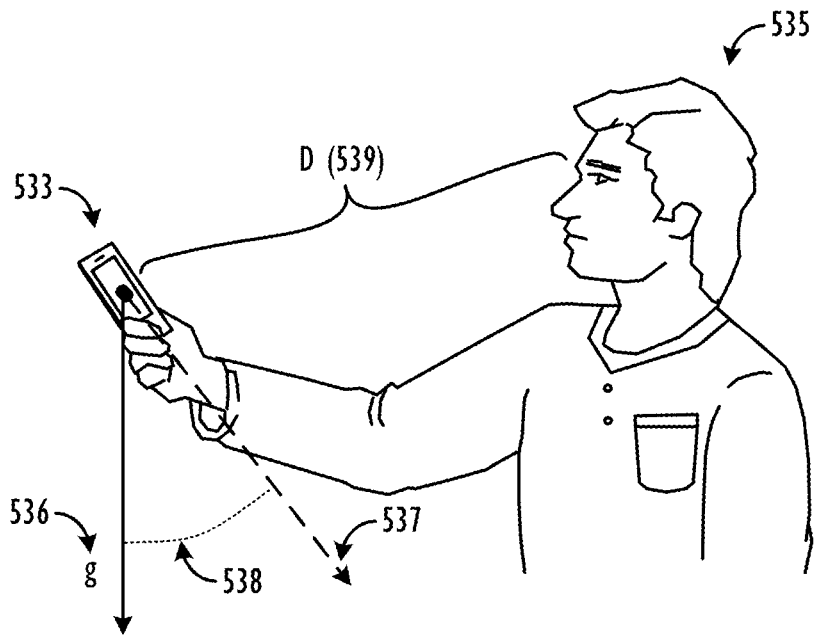
FIG. 5C is a picture illustrating a gravity vector relative to an image capture device being used to capture a wide FOV video image stream, according to various embodiments.

FIG. 5C is a picture illustrating a gravity vector 536 relative to an image capture device being used to capture a wide FOV video image stream being rotated about an exemplary axis 537, according to various embodiments. In FIG. 5C, a user 535 is holding a portable electronic device 533 having a front-facing wide FOV camera at a distance, D (539), away from his face. At the moment that device 533 is capturing the current image of the user's face, it is being held in a tilted position at an exemplary angle (538) with respect to gravity, g (536). As mentioned above, in some embodiments, it may be desired to include an additional correction for device tilt (e.g., based on the device's current rotation, as obtained and/or derived from a positional sensor associated with a three-dimensional position of the device during the capture of the image) in the final perspective transformation applied to the image being captured at that moment by device 533. In other words, by knowing where the gravity vector 536 is relative to the camera's current position, a perspective distortion correction module can apply similar rotations and projections to those described above with reference to FIG. 2B, in order to figure out where the gravity vector currently points with respect to the current output image. For example, if, using the rotations and projections described above, the gravity vector were determined to point to the lower-left corner with respect to the current output image, the current output image could be further rotated, such that the projected gravity vector would point downwards with respect to the current output image (i.e., pointing downward and to the center of the current output image, rather than towards the lower-left corner of the current output image).

In some embodiments, the system may determine a gravity correction parameter based on the obtained gravitational vector and apply the combined distortion correction to the captured image based on the determined gravity correction parameter. In some cases, the gravity correction may be a single parameter, but it the amount of additional rotation may be applied differently at each pixel of the image, based on the parameter as well as the respective pixel's location within the camera's FOV.

Figure 5D:
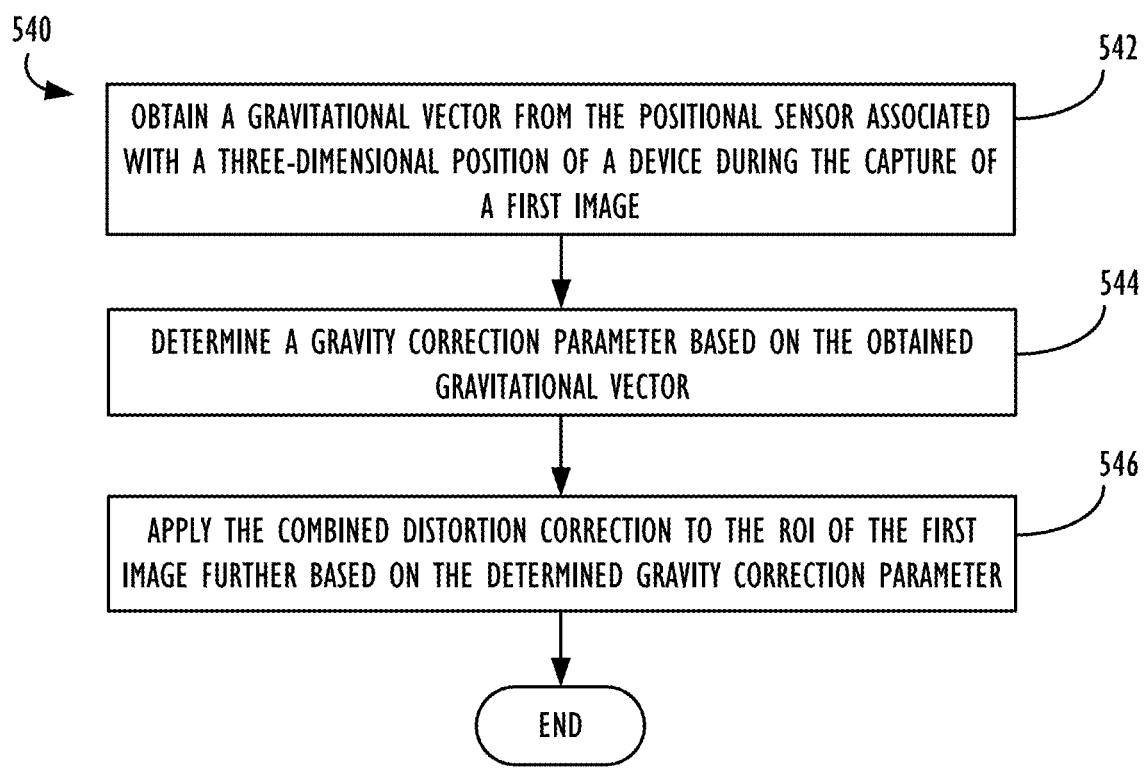
FIG. 5D is a flow chart illustrating a method of accounting for a gravitational vector during perspective distortion correction of a wide FOV video image stream, according to various embodiments.

FIG. 5D is a flow chart illustrating a method 540 of accounting for a gravitational vector during perspective distortion correction of a wide FOV video image stream, according to various embodiments. First, at Step 542, the method 540 may obtain a gravitational vector from the positional sensor associated with a three-dimensional position of a device during the capture of a first image. Next, at Step 544, the method 540 may determine a gravity correction parameter based on the obtained gravitational vector. Finally, at Step 546, the method 540 may apply the combined distortion correction to the ROI of the first image further based on the determined gravity correction parameter. As mentioned above, in some cases, the gravity correction parameter may be a single value, from which individual correction amounts may be derived for each pixel or set of pixels in the first image.

Rescaling and/or Shifting a Determined Image Portion Due to Inclusion of "Invalid Pixels"

Figure 5E:
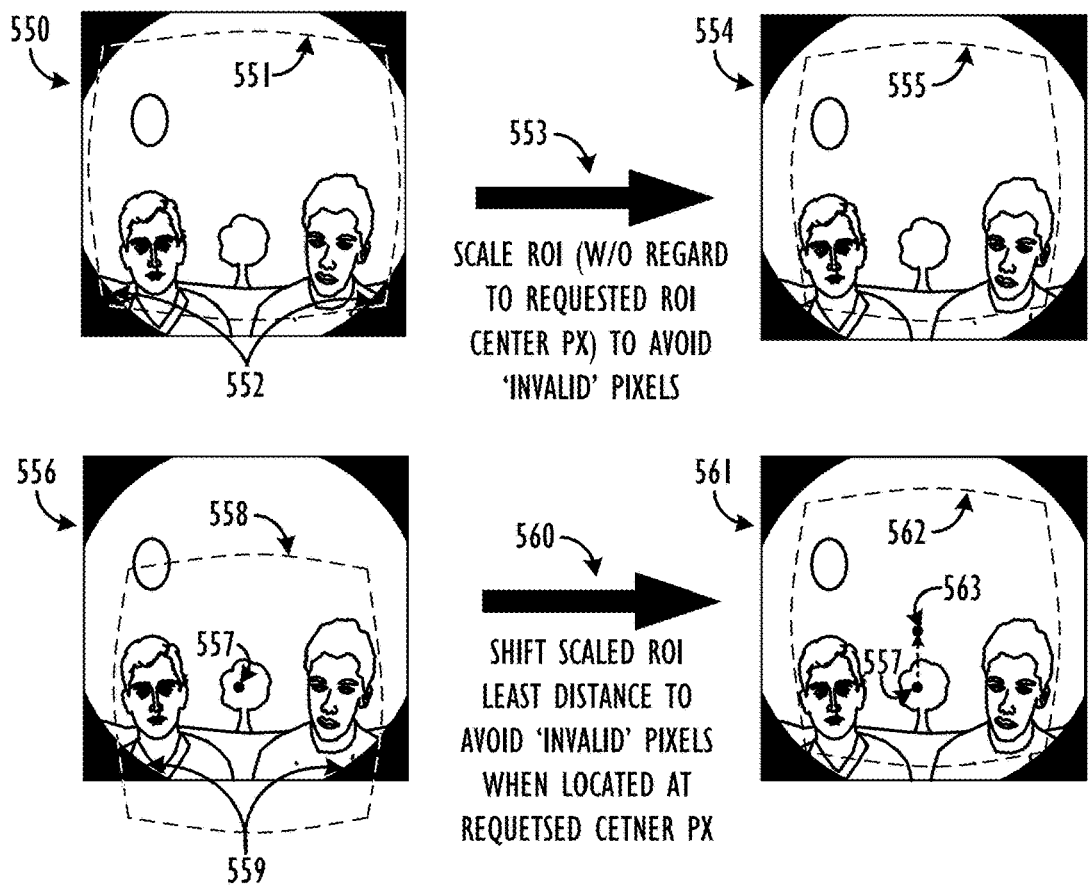
FIG. 5E includes pictorial examples of rescaling and/or shifting an image portion from a wide FOV video image stream, according to various embodiments.

FIG. 5E includes pictorial examples (550/554/556/561) of rescaling and/or shifting an image portion from a wide FOV video image stream, according to various embodiments. The pictorial examples in FIG. 5E depict the same scene as shown in image 100 of FIG. 1. Beginning at picture 550, the size of a requested ROI portion 551 is shown with a dashed line box. As illustrated, the size of requested ROI portion 551 is too large for the wide FOV camera. That is, even when centered at the center of the wide FOV camera's FOV, the requested ROI portion 551 is so large that it pulls in one or more invalid pixels 552 (e.g., the black pixels around the periphery of the picture 550). Thus, according to some embodiments, a first step to accommodate the over-sized requested ROI portion box is to scale (553) the ROI (without regard to the requested ROI's actual requested center location) until it is small enough that it no longer pulls in one or more invalid pixels.

Picture 554 shows a result of this process, with the original centered requested ROI portion 551 scaled down to the dimensions of downscaled centered requested ROI portion 555, which does not include any invalid pixels. Thus, the system now knows that downscaled centered requested ROI portion 555 would at least be a plausible size, if it were centered at the center of the wide FOV camera's FOV. However, the original centered requested ROI portion 551 will also include a requested location, e.g., in terms of a center pixel.

Picture 556 shows a result of centering downscaled requested ROI portion 558 at the requested location of the ROI, in this case, center pixel 557. As illustrated, centering the downscaled requested ROI portion 558 at center pixel 557 again results in the inclusion of one or more invalid pixels 559 (e.g., the black pixels around the bottom periphery of the picture 556). Thus, according to some embodiments, a second step to accommodate the requested position of the ROI portion box is to shift (560) the downscaled requested ROI portion 558 the least distance possible (e.g., always shifting towards the center of the wide FOV image's FOV), until it has been shifted centrally far enough that it no longer pulls in one or more invalid pixels.

As illustrated in picture 561, the downscaled requested ROI portion 558 ends up as downscaled and shifted requested ROI portion 562. The amount of shifting is indicated by the movement of requested center pixel 557 from its initial requested position to shifted position 563. As may now be understood, in the example of FIG. 5E, rather than using the exact location and dimensions of the requested ROI portion box 551, the techniques disclosed herein would cause the perspective distortion-corrected output image to be generated from the portion of the original image occurring within downscaled and shifted requested ROI portion 562. While this would not be the exact aesthetic framing for the current image requested by the system, it would be the closest feasible approximation of the requested ROI portion that did not include any invalid pixel regions. As discussed above, a search algorithm, e.g., a binary search operation, may be used to efficiently find the smallest possible scaling and/or shifting amounts needed to cause the requested ROI to fit completely within the input image's FOV.

Figure 5F:
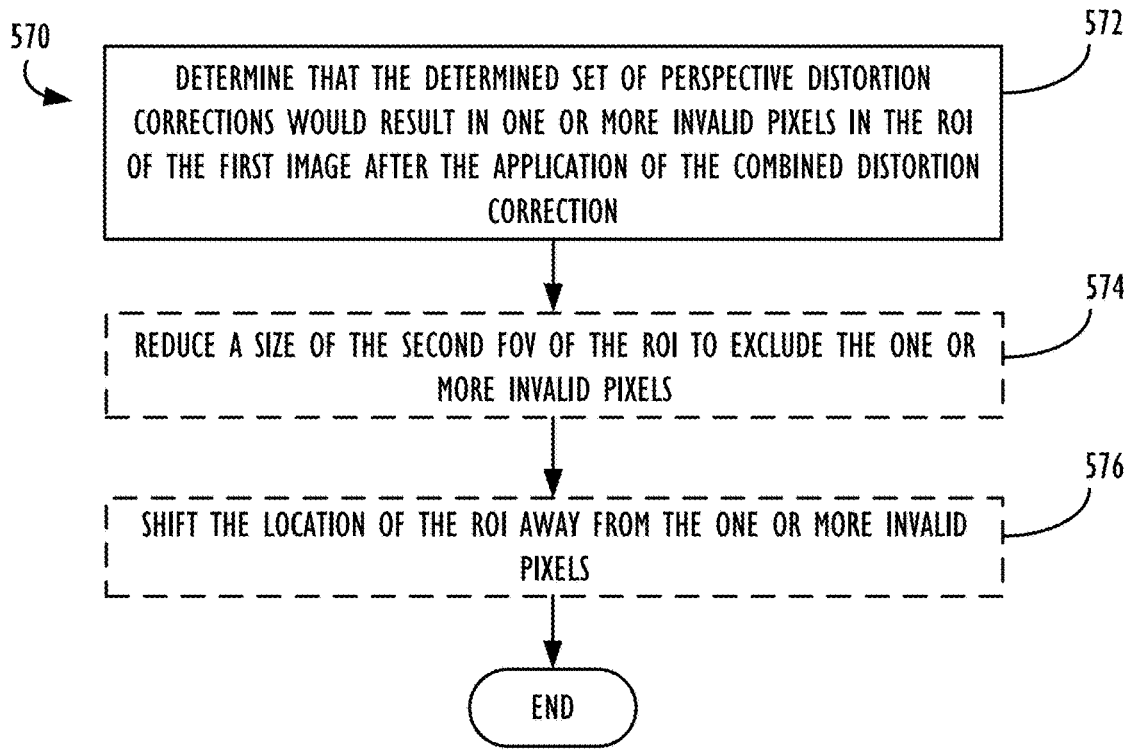
FIG. 5F is a flow chart illustrating a method of rescaling and/or shifting an image portion from a wide FOV video image stream, according to various embodiments.

FIG. 5F is a flow chart illustrating a method 570 of rescaling and/or shifting an image portion from a wide FOV video image stream, according to various embodiments. First, at Step 572, the method 570 may determine that the determined set of perspective distortion corrections would result in one or more invalid pixels in the ROI of the first image after the application of the combined distortion correction. Next, at Step 574, the method 570 may optionally reduce a size of the second FOV of the ROI to exclude the one or more invalid pixels. Finally, at Step 576, the method 570 may optionally shift the location of the ROI away from the one or more invalid pixels (e.g., towards the center of the input image FOV).

Composited Region of Interest Framing Determinations

Figure 6:
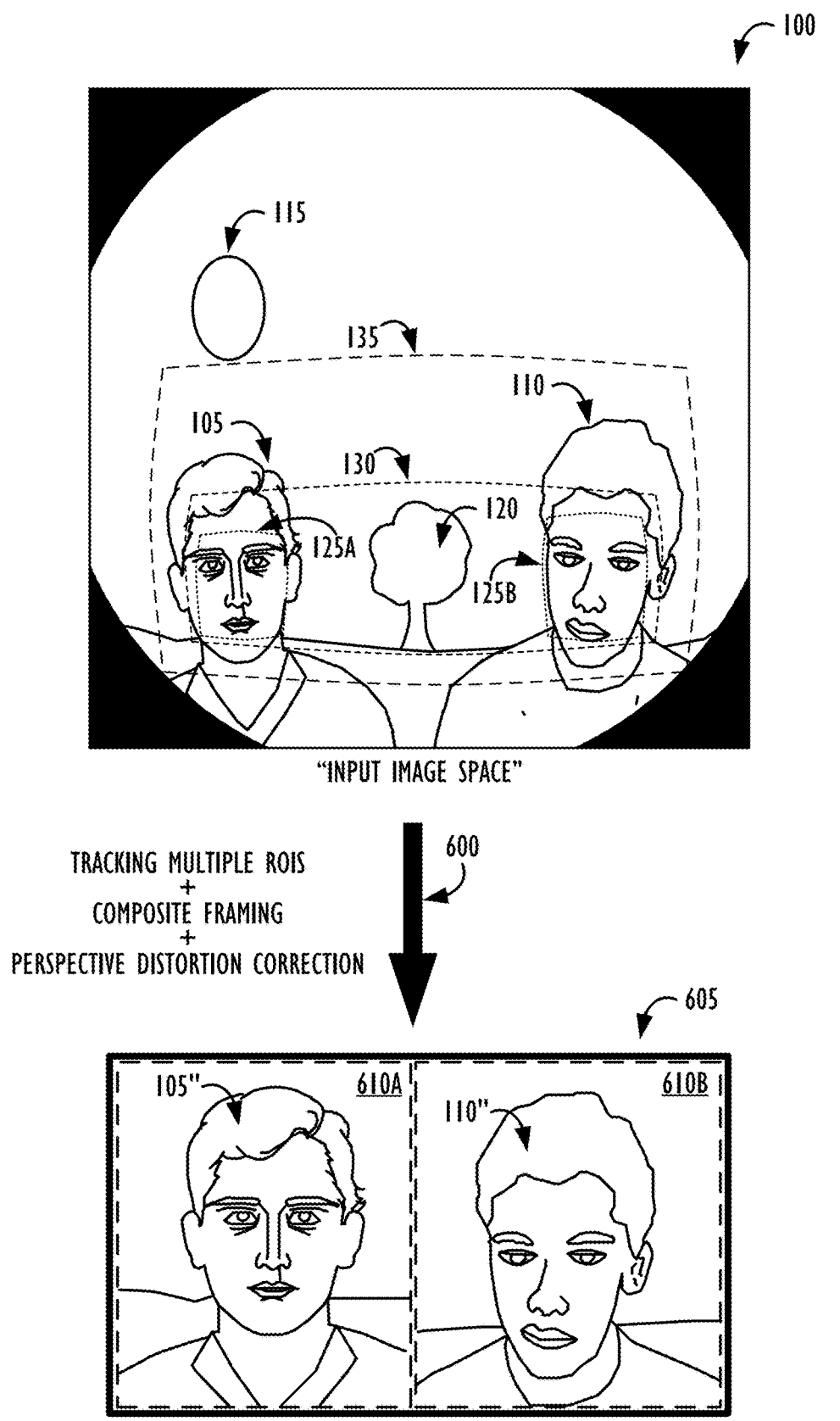
FIG. 6 illustrates an exemplary wide FOV image and a framed and distortion-corrected portion thereof comprising two ROIs composited side-by-side, according to one or more embodiments.

FIG. 6 illustrates an exemplary wide FOV image 100 and a framed and distortion-corrected portion thereof 605 comprising two ROIs (610A/610B) composited side-by-side, according to one or more embodiments. As in the example described above with reference to FIG. 1, the process 600 illustrated in FIG. 6 identifies the same two first ROIs 125A and 125B in the image 100. However, rather than determining a second ROI 130' that contains two first ROIs 125A and 125B and using that second ROI 130' to determine a final portion for use in the generation of the output image version of image 100 (as in FIG. 1), the process 600 illustrated in FIG. 6 elects instead to obtain and perspective correct each of the two first ROIs 125A and 125B independently, e.g., according to the process described in FIG. 5A, resulting in perspective-corrected versions of the human subjects 105" and 110" appearing in regions 610A and 610B, respectively, of output image 605.

As illustrated in FIG. 6, in this example the output image 605 is a generated composite output image, including both regions 610A and 610B in a non-overlapping fashion. It is to be understood that other compositions are possible, too, such as partially-overlapping or blended compositions of multiple discrete ROIs, etc. Embodiments such as illustrated in process 600 may be useful when, e.g., there are two or more subjects or regions of interest spaced far apart in a captured scene, and it would be desirable to transmit images of each of the two or more subjects, but not feasible to create a large enough single, contiguous, image portion to contain each of the two or more subjects. It is to be understood that, if, e.g., one of the two or more subjects leaves the captured scene (or otherwise stops being tracked by the system), the output image framing may transition back to just showing a single subject/ROI, e.g., by region 610A gradually expanding to the right edge of image 605 (and preferably recentering human subject 105" in the process), or by simply removing region 610B from the output image 605, etc.

Exemplary Electronic Computing Devices

Figure 7:
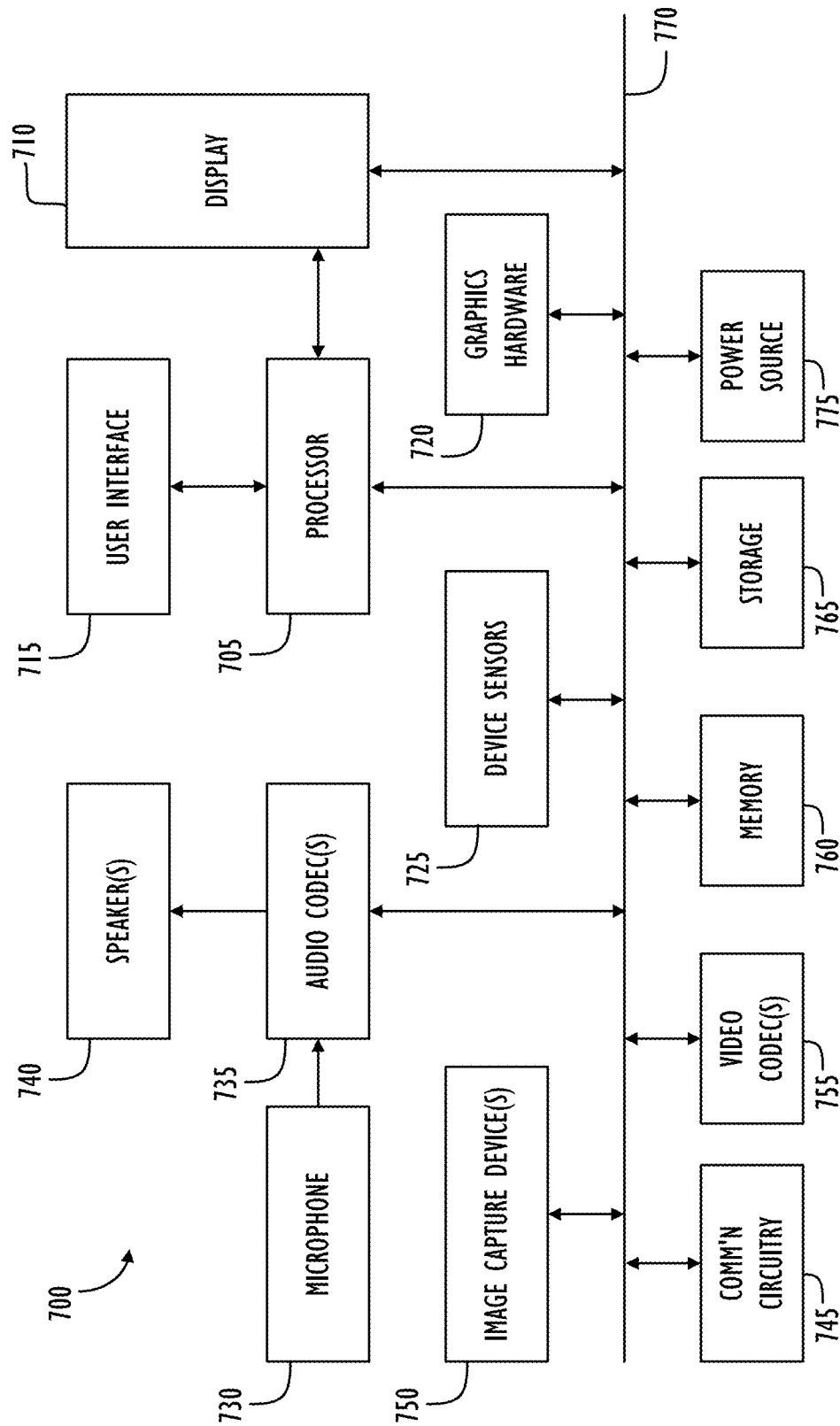
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyroscope), microphone 730, audio codec(s) 735, speaker(s) 740, communications circuitry 745, image capture device 750, which may, e.g., comprise multiple camera units/optical image sensors having different characteristics or abilities (e.g., Still Image Stabilization (SIS), HDR, OIS systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs) and/ or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 750 may comprise one or more camera units configured to capture images, e.g., images which may be processed to generate distortion-corrected versions of said captured images, e.g., in accordance with this disclosure. Output from image capture device 750 may be processed, at least in part, by video codec(s) 755 and/or processor 705 and/or graphics hardware 720, and/or a dedicated image processing unit or image signal processor incorporated within image capture device 750. Images so captured may be stored in memory 760 and/or storage 765. Memory 760 may include one or more different types of media used by processor 705, graphics hardware 720, and image capture device 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A device, comprising:
   a memory;
   one or more image capture devices; and
   one or more processors operatively coupled to the memory, wherein the one or more processors are configured to execute instructions causing the one or more processors to:
   obtain an incoming image stream from at least one of the one or more image capture devices, wherein the incoming image stream comprises two or more images;
   determine a set of geometric distortion corrections for a first image from the incoming image stream, wherein the first image has a first field of view (FOV);
   determine a region of interest (ROI) in the first image, wherein the ROI comprises a location within the first image and a second FOV, wherein the second FOV is smaller than or equal to the first FOV, and wherein the ROI comprises a region within the first image that it is desired to focus a perspective distortion correction on;
   determine a set of perspective distortion corrections for the first image based, at least in part, on the location and second FOV of the ROI;
   determine a set of fisheye distortion corrections to apply to a perspective distortion corrected version of the first image based, at least in part, on the location and second FOV of the ROI; and
   apply a combined distortion correction to the ROI of the first image based on:

the determined set of geometric distortion corrections; and
a combination of the determined set of perspective distortion corrections and the determined set of fisheye distortion corrections.

2. The device of claim 1, wherein the one or more processors are further configured to execute instructions causing the one or more processors to:
determine a set of geometric distortion corrections for a second image from the incoming image stream, wherein the second image has the first FOV, and wherein the second image is captured after the first image;
determine a second ROI in the second image, wherein the second ROI comprises a second location within the second image and a third FOV, wherein the third FOV is smaller than or equal to the first FOV, and wherein the second ROI comprises a region within the second image that it is desired to focus a perspective distortion correction on;
determine a second set of perspective distortion corrections for the second image based, at least in part, on the second location and third FOV of the second ROI;
determine a second set of fisheye distortion corrections to apply to a perspective distortion corrected version of the second image based, at least in part, on the second location and third FOV of the second ROI; and
apply a second combined distortion correction to the second ROI of the second image based on:
the determined second set of geometric distortion corrections; and
a combination of the determined second set of perspective distortion corrections and the determined second set of fisheye distortion corrections.

3. The device of claim 1, wherein the ROI further comprises a region in the first image including one or more people, animals, or objects of interest.

4. The device of claim 1, further comprising a positional sensor, wherein the one or more processors are further configured to execute instructions causing the one or more processors to:
obtain a gravitational vector from the positional sensor associated with a three-dimensional position of the device during the capture of the first image.

5. The device of claim 4, wherein the instructions causing the one or more processors to apply the combined distortion correction to the ROI of the first image further comprise instructions causing the one or more processors to:
determine a gravity correction parameter based on the obtained gravitational vector; and
apply the combined distortion correction to the ROI of the first image further based on the determined gravity correction parameter.

6. The device of claim 1, wherein the one or more processors are further configured to execute instructions causing the one or more processors to:
determine that the determined set of perspective distortion corrections would result in one or more invalid pixels in the ROI of the first image after the application of the combined distortion correction.

7. The device of claim 6, wherein, in response to determining that the determined set of perspective distortion corrections would result in one or more invalid pixels in the first image, the one or more processors are further configured to execute instructions causing the one or more processors to:
shift the location of the ROI away from the one or more invalid pixels.

8. The device of claim 6, wherein, in response to determining that the determined set of perspective distortion corrections would result in one or more invalid pixels in the first image, the one or more processors are further configured to execute instructions causing the one or more processors to:
reduce a size of the second FOV of the ROI to exclude the one or more invalid pixels.

9. The device of claim 1, wherein the one or more processors are further configured to execute instructions causing the one or more processors to:
determine a second ROI in the first image, wherein the second ROI comprises a second location within the first image and a third FOV, wherein the second ROI comprises a second region within the first image that it is desired to focus a second perspective distortion correction on;
determine a second set of perspective distortion corrections for the first image based, at least in part, on the second location and third FOV of the second ROI;
determine a second set of fisheye distortion corrections to apply to a perspective distortion corrected version of the second image based, at least in part, on the second location and third FOV of the second ROI; and
apply a second combined distortion correction to the second ROI of the first image based on:
the determined set of geometric distortion corrections; and
a combination of the determined second set of perspective distortion corrections and the determined second set of fisheye distortion corrections.

10. The device of claim 9, wherein the one or more processors are further configured to execute instructions causing the one or more processors to:
generate a first output image, wherein the first output image comprises:
(a) the ROI of the first image after the application of the combined distortion correction; and
(b) the second ROI of the first image after the application of the second combined distortion correction.

11. The device of claim 10, wherein the first output image further comprises a composite image including:
(a) the ROI of the first image after the application of the combined distortion correction; and
(b) the second ROI of the first image after the application of the second combined distortion correction,
wherein (a) and (b) are composited in a non-overlapping fashion.

12. The device of claim 1, wherein the determined set of perspective distortion corrections and the determined set of fisheye distortion corrections each comprise global transformations.

13. The device of claim 1, wherein the combination of the determined set of perspective distortion corrections and the determined set of fisheye distortion corrections comprises a weighted average between the determined set of perspective distortion corrections and the determined set of fisheye distortion corrections.

14. The device of claim 13, wherein the weighted average between the determined set of perspective distortion corrections and the determined set of fisheye distortion corrections is determined based, at least in part, on a size of the second FOV.

15. The device of claim 1, wherein the one or more processors are further configured to execute instructions causing the one or more processors to:
    display the ROI of the first image after the application of the combined distortion correction on a display of the device.

16. The device of claim 1, wherein the one or more processors are further configured to execute instructions causing the one or more processors to:
    generate a first output image, wherein the first output image comprises the ROI of the first image after the application of the combined distortion correction.

17. The device of claim 16, wherein the one or more processors are further configured to execute instructions causing the one or more processors to:
    store the first output image in the memory of the device.

18. The device of claim 16, wherein the one or more processors are further configured to execute instructions causing the one or more processors to:
    transmit the first output image to a second device.

19. A non-transitory computer readable medium comprising computer readable instructions executable by one or more processors to:
    obtain an incoming image stream from at least one image capture device, wherein the incoming image stream comprises two or more images;
    determine a set of geometric distortion corrections for a first image from the incoming image stream, wherein the first image has a first field of view (FOV);
    determine a region of interest (ROI) in the first image, wherein the ROI comprises a location within the first image and a second FOV, wherein the second FOV is smaller than or equal to the first FOV, and wherein the ROI comprises a region within the first image that it is desired to focus a perspective distortion correction on;
    determine a set of perspective distortion corrections for the first image based, at least in part, on the location and second FOV of the ROI;
    determine a set of fisheye distortion corrections to apply to a perspective distortion corrected version of the first image based, at least in part, on the location and second FOV of the ROI; and
    apply a combined distortion correction to the ROI of the first image based on:
        the determined set of geometric distortion corrections; and
        a combination of the determined set of perspective distortion corrections and the determined set of fisheye distortion corrections.

20. An image processing method, comprising:
    obtaining an incoming image stream from at least one image capture device, wherein the incoming image stream comprises two or more images;
    determining a set of geometric distortion corrections for a first image from the incoming image stream, wherein the first image has a first field of view (FOV);
    determining a region of interest (ROI) in the first image, wherein the ROI comprises a location within the first image and a second FOV, wherein the second FOV is smaller than or equal to the first FOV, and wherein the ROI comprises a region within the first image that it is desired to focus a perspective distortion correction on;
    determining a set of perspective distortion corrections for the first image based, at least in part, on the location and second FOV of the ROI;
    determining a set of fisheye distortion corrections to apply to a perspective distortion corrected version of the first image based, at least in part, on the location and second FOV of the ROI; and
    applying a combined distortion correction to the ROI of the first image based on:
        the determined set of geometric distortion corrections; and
        a combination of the determined set of perspective distortion corrections and the determined set of fisheye distortion corrections.

* * * * *